(12) United States Patent
Rosenberg et al.

(10) Patent No.: US 10,768,421 B1
(45) Date of Patent: Sep. 8, 2020

(54) VIRTUAL MONOCLE INTERFACE FOR INFORMATION VISUALIZATION

(71) Applicant: Knowledge Initiatives LLC, The Sea Ranch, CA (US)

(72) Inventors: Barr Rosenberg, The Sea Ranch, CA (US); Mark Gilbeau Howard, Orinda, CA (US); Alex Howard, Longmont, CO (US); Ian Howard, Portland, OR (US)

( * ) Notice: Subject to any disclaimer, the term of this patent is extended or adjusted under 35 U.S.C. 154(b) by 0 days.

(21) Appl. No.: 15/653,469

(22) Filed: Jul. 18, 2017

Related U.S. Application Data

(60) Provisional application No. 62/363,780, filed on Jul. 18, 2016.

(51) Int. Cl.
| | |
|---|---|
| *H04N 21/81* | (2011.01) |
| *G02B 27/01* | (2006.01) |
| *G06F 1/16* | (2006.01) |
| *G06F 3/01* | (2006.01) |
| *H04N 13/286* | (2018.01) |

(52) U.S. Cl.
CPC ....... *G02B 27/017* (2013.01); *G02B 27/0172* (2013.01); *G06F 1/1673* (2013.01); *G06F 3/011* (2013.01); *G06F 3/013* (2013.01); *G06F 3/015* (2013.01); *G02B 2027/0178* (2013.01); *H04N 13/286* (2018.05)

(58) Field of Classification Search
USPC ...... 345/440, 8; 382/168; 715/830, 764, 810
See application file for complete search history.

(56) References Cited

U.S. PATENT DOCUMENTS

| | | | |
|---|---|---|---|
| 2015/0033125 A1* | 1/2015 | Kang | G06F 3/0485 715/719 |
| 2017/0046872 A1* | 2/2017 | Geselowitz | G06T 11/206 |
| 2017/0272838 A1* | 9/2017 | Glazer | H04N 21/8146 |

* cited by examiner

*Primary Examiner* — Deeprose Subedi
(74) *Attorney, Agent, or Firm* — Wilson Sonsini Goodrich & Rosati

(57) ABSTRACT

A virtual monocle interface system comprising multiple interfaces for accessing, presenting, and interacting with multi-dimensional information objects is described. The information objects are visualized in multiple formats across multiple different display units, and displayed for the user to see in two dimensional, two-and-one-half dimensional, or three dimensional forms. The information objects can also be visualized using virtual reality.

26 Claims, 13 Drawing Sheets

VIRTUAL MONOCLE INTERFACE FOR INFORMATION VISUALIZATION

CROSS-REFERENCE

This application claims priority to U.S. Provisional Application No. 62/363,780 filed on Jul. 18, 2016, which application is entirely incorporated herein by reference.

BACKGROUND

There is an abundance of information available on the internet: some very valuable and some worthless. The relevance and importance of information varies from user to user, and over time the preferences of a single user may change. Unfortunately, past preferences of the user are often controlled by a backend system that the user may have no direct control over. For example, a search system may weight a user's preferences based on the articles the user has viewed in the past, or the preferences of the user's friend network. Unfortunately, the weighting of the backend classification system may or may not reflect the actual interests of the user and thus may present substantial bias. The bias presented by the classifier of the classification system may make it difficult to obtain information that best reflect the user's real interests.

Additionally, with the growth and abundance of available information, individuals find it increasingly difficult to engage with, store, and share information. Although an increasing number of businesses and individuals collect and organize complex digital content via their electronic devices, systems and methods for engaging with the information are not as easily adapted/customized to the preferences and needs of the information consumer. Furthermore, the number and types of devices owned/operated by an individual user has grown in the absence of a coherent system and method for integrating or combining various types of such devices to provide users with synergistic benefits unachievable through a single device.

SUMMARY

A need exists for data visualization systems and methods that coordinate multiple devices and display units to provide users with meaningful and interactive engagement with information. For example, since devices come in various formats and form factors (e.g., personal computer, laptop, mobile phone, personal digital assistant (PDA)), and may include a variety of display units (e.g., dual-monitor screens, touch screen display), a plurality of devices can be arranged to better present user-curated content and further facilitate a more customized data visualization experience. The terms "screen" and "display" are used below to refer to display units.

More specifically, a need exists for systems that integrate and allow users to customize their preferences dynamically, along with interfaces that can facilitate presentation of information across multiple distinct devices. Such configuration can enable digital "information connoisseurs" to curate their preferences and interests, allowing them, for example, to build a time-lapse representation of their interests while also providing a monocle (via a secondary device), which users can use to interact with and visualize information in various formats.

The methods and systems disclosed herein are directed towards a multi-dimensional, multi-screen dynamic interface that provides immersive and perspective interaction with datasets that may be connected, related or diverse. A virtual monocle interface system may comprise one or more devices and corresponding interfaces for information visualization. The virtual monocle interface system may comprise two or more distinct computer rendered graphical user interfaces (GUIs) configured for displaying relationships between information objects using various shapes organized within a multi-dimensional structure. The GUIs may be distinct from each other, presenting the same content in visually distinct forms. In some embodiments, a virtual monocle interface system may comprise two or more computer rendered GUIs displayed on two or more devices, and be deployed for individual or collaborative applications to integrated diverse types of information or content.

In some instances a graphical user interface may be configured to provide information regarding a network of information objects. As used herein, "information objects" may generally refer to data models for representing information, wherein information may be represented as an object. Each object can be depicted as a simple node in a two-dimensional image on a flat screen or multi-dimensional (e.g., a two- or three-dimensional (3D) structure depicted on a flat screen or in a virtual reality display); information objects can form a network, wherein the network of information objects can represent a database comprising a plurality of records, information, content or the like; a plurality of records may be linked or related using a mathematical relationship defined in a three-dimensional space, for example.

In some embodiments relationships between concepts are depicted as a cityscape (or other contextual structural metaphor of the user's choice), with buildings representing content as multi-dimensional information objects, and floors within buildings as information sub-objects. Information objects may be connected by edges, lines, roads, or other architectural features. Users may engage with the interface by adjusting, traversing, and manipulating the views of information objects in the system, for example, in response to user gestures. A virtual monocle interface system may further comprise a web-browser plug-in, for collecting and curating information, or for monitoring and/or recording a user's website browsing history for later access in a mapped or easy to navigate format.

A computer rendered graphical user interface for dynamic display, engagement, and organization of user-selected content may comprise multiple planes (i.e., two-dimensional geometric surfaces) comprising multi-dimensional information objects; for example, a first plane comprising one-dimensional, two-dimensional, or three-dimensional information objects, and a second plane comprising one-dimensional, two-dimensional, or three-dimensional information objects. In some instances a plurality of graphical elements (e.g., edges) may connect information objects in the first plane with information objects in the second plane. In some embodiments, a virtual monocle interface system may comprise a timeline, and selected content may comprise historical events and fictionalized historical events positioned along the timeline. In further embodiments, the first plane may represent historical events and the second plane may represent fictionalized historical events. A method for representing content for simplified analysis may comprise performing multiple steps using a virtual monocle interface system. Steps may include selecting content from a database, displaying the content in a three-dimensional interface, sorting through the displayed content to curate, order, or select preferences; and distilling content into an optimized set of sub-objects. Such a method may be applied to selected or curated content, and/or data collected from a database that comprises content selected or extracted from one or more websites. In specific instances, for example, content may include recipes, and the optimized set of sub-objects may comprise a grocery item shopping list.

In an aspect, a computer-implemented method for visualizing a structured, multi-dimensional dataset on multiple display units is disclosed. The method may comprise: receiving, from a database, datasets according to a user request, the datasets comprising a plurality of information objects, wherein the plurality of information objects are a set of records linked or related using a mathematical relationship defined in a multi-dimensional space and wherein each information object comprises structured data including sub-objects; displaying, on a first graphical user interface of a first device, a first visualization of the plurality of information objects; determining, by one or more processors, a subset of the plurality of information objects to be displayed on a second graphical user interface based at least on user information, user inputs, and information obtained from the first device and a second device; and displaying, on the second graphical user interface of the second device, a second visualization of the subset of the information objects, the second visualization different in form from the first visualization.

In some embodiments, the first visualization is in a three-dimensional space. In some embodiments, the second visualization is in a two-dimensional space. In other embodiments, the first visualization or the second visualization is in a virtual reality environment.

In some embodiments, the plurality of information objects can be represented in the three-dimensional space using aerial projections. The subset of the plurality of information objects can be represented in a two-dimensional space, wherein the subset of the plurality of information objects are flattened into a two-dimensional space and additional contextual information related to the information objects are introduced on the second graphical user interface.

The information objects can have different geometric shapes based at least on the type of the information, the importance of the information, and user feedback or input. The geometric shapes may comprise barrels, cones, cubes, cylinders, ellipsoids, polygons, and pyramids.

In some embodiments, the more important information objects have larger sized geometric shapes compared to less important information objects. The correlation among information objects can be visualized using edges, wherein the edges comprise lines or arrows.

The information objects can be repositioned and highlighted for visualization of contextual information.

The plurality of information objects can be represented in a cityscape visual format, wherein each information object is represented by a building structure and the structured data within each information object is represented as floors of the building structure. The first visualization may include building structures and the second visualization includes floors.

The first graphical user interface can be larger than the second graphical user interface. The second device can be a mobile device. The first device can be a head-mounted display configured to project the plurality of objects in the virtual environment and wherein the subset of the plurality of information objects are determined based at least on the orientation and eye-movement of a user of the head-mounted display.

The second device can be a head-mounted display configured to project the subset of the plurality of objects in a virtual environment.

In some embodiments, the information obtained by the first device and the second device may comprise orientation and motion data, wherein the orientation and motion data is obtained from sensors onboard the first device and second device.

The dataset may further comprise a context array, the context array comprising data on the user including the user's identity, historic activity, and preferences, and wherein the first visualization and the second visualization is based at least on the context array. The user inputs may comprise gestures. The gestures may comprise tap, double-tap, drag, pinch, press, swipe.

In another aspect, a virtual monocle interface system for visualizing information is introduced. The system may comprise: a database configured to store a plurality of information objects, wherein the plurality of information objects are a set of records linked or related using a mathematical relationship defined in a multi-dimensional space and wherein each information object comprises structured data including sub-objects; a first device comprising a first graphics user interface; a second device comprising a second graphical user interface; and one or more processors in communication with a computer readable medium storing software instructions that are executable by the one or more processors in order to cause the virtual monocle interface system to: receive, from the database, the plurality of information objects corresponding to a user request; display, on the first graphical user interface of the first device, a first visualization of the plurality of information objects; determine, by the one or more processors, a subset of the plurality of information objects to be displayed on the second graphical user interface based at least on user information, user inputs, and information obtained from the first device and the second device; and display, on the second graphical user interface of the second device, a second visualization of the subset of the information objects, the second visualization different in form from the first visualization.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
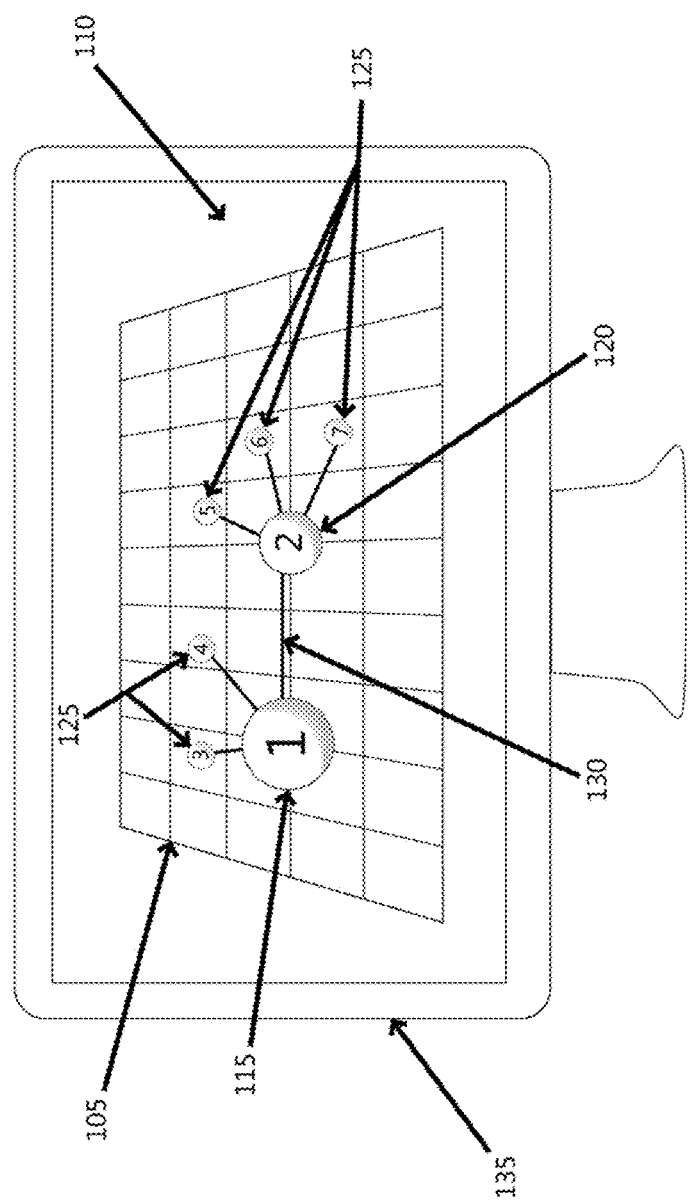
FIG. 1 illustrates a multi-dimensional aerial display.

An individual's preferences for information reflect their interests and to some degree their daily life activities. Over time, the interests of an individual may change, as they evolve and events shift their perspective and interests. For example, an individual in his/her 20s may be interested in college, sports and fitness. Ten years later, the same individual in his/her 30s may be in mid-management level at a company and interested in leadership or he/she may start a family and their interests may include family, and child rearing. The same individual in their 60s may instead be interested in gardening, or golf. A virtual monocle interface system can allow individuals to carefully curate their interests as they advance in age and experience. The individual may then reflect over their experiences and recall the events that led to key changes in their experience over time.

Additionally, individuals increasingly rely on classification systems to help them search and locate information. Classification systems rely on a set of variables or features that have been selected to identify interests of the user. The features are extracted from the inputs provided by the user, and the weights or importance of the features is iteratively refined over time, allowing the classification system to be tuned towards the particular preferences of the user. In most instances, the refinement process occurs in the background, and a user may not even be aware of how their interests are being used to shape and modulate the information being produced. As a result, users may be subtly manipulated or biased by the information they are provided. In some instances, bias may occur due to bias built into the classification algorithm itself. A virtual monocle interface system provides the tools for a user to consciously create a dimensional representation of their interests and thus more carefully control and more evocatively display the information they are receiving.

Furthermore, in fields where domain specific knowledge is heavily guarded (e.g., non-public, confidential, sensitive, etc.), a virtual monocle interface system may provide a means for sharing information between individuals in a secure and private manner, for example. This sharing of information may be direct or indirect, it may be monetized on a pay per use basis, a subscription model or by other means.

Fields or industries in which an individual's knowledge of key information can directly impact success or failure may place high value on scarce information and the ability to forecast trends or underlying causal relationships. Such fields may include finance or academic science. In finance, for example, the relevance and scarcity of knowledge and information can have direct impact on market fluctuations. Knowledge may be obtained from a variety of sources including observations regarding the state of a particular industry, reports made available through news sources, and awareness of various events that may impact a particular location or general confidence in the markets. In academic science, for example, information that is not readily available can potentially hold high value because the success of a scientist can partially be based on the production of high quality publications. In the scientific domain, the knowledge may be accrued through experience and exposure from conducting experiments and assessing the relative success or failure of the experiments. Given different needs for ways to visualize/interact with data in different domains, a virtual monocle interface system can provide individuals with the tools to track and monitor domain specific information and interact with information in ways that promote and support new perspectives and views, as well as facilitate the sharing of and collaboration around those views.

A virtual monocle interface system can provide users with the tools to build their interests into a customizable rendering, allowing them to create a multi-dimensional and/or multi-device rendering of their preferences and interests, and monitor those interests, preferences, and collected content over time and through different interfaces, including man-machine interfaces. A virtual monocle interface system provides the tools for a user to interact with news and information regarding their curated interests using different interfaces for presenting the content. The interfaces may be displayed on the same or different devices, enabling the user to build a multi-dimensional/multi-device rendering of their preferences within one mode and view content related to their preferences in another mode. The multi-dimensional/multi-device rendering may be provided by or shared with others. A virtual monocle interface system may comprise multi-dimensional/multi-device tools that allow users to curate their preferences and the content they interact with. The virtual monocle interface system may help users with a variety of information visualization/organization needs including, but not limited to, tracking diverse information items relating to a complex project, analyzing relationships, preserving personal memory records, aiding in hypothesis generation, and customizing content curation.

A virtual monocle interface system provides tools for a user to engage with content using multiple interfaces and/or displays that can support both the big-picture, perspective or immersive views of the higher order connectivity of information, as well as the local connectivity or the details and specific information relating to a component of a network or information related to a particular feature of the network. A virtual monocle interface system may comprise two or more interfaces, displayed on one or more screens. The two or more interfaces may present complementary information from different perspectives (e.g. higher level or network view on one interface and lower level detailed view on a second interface). In some instances a virtual monocle interface system may comprise two or more screens. In some instances, each screen is associated with a separate device. A first screen may depict a three-dimensional topographical or network view for displaying the connectivity of information in a graphical way (e.g., with nodes and edges, wherein nodes may comprise information objects with discrete geometry and shapes, and edges may comprise lines, arrows, dashes, or other means of displaying connectivity between two nodes or among three or more nodes). A second screen may present information that is similar or related to information displayed on the first screen, but in a different format or different method. For example, the second interface may be configured to display a different level of connectivity (e.g., local connectivity around a specific object, or a shared feature that is common amongst the information objects, or details about a specific component represented as part of the network of information presented in the first screen). The first and second screens may be connected to different operating systems (e.g., a mobile device and a monitor or television) or can be connected as part of the same operating system (e.g., in a dual monitor system). In systems where the first and second screens are connected to different operating systems, the screens and content may synchronize based on inputs including sound, images (e.g. photo, video), or other wireless communication (e.g. infrared, radiowaves, Bluetooth, etc.)

The methods, devices, and systems disclosed herein are directed towards multi-dimensional electronic environments equipped for engaged user interaction. The virtual monocle interface systems disclosed herein may comprise electronic devices, databases, applications, computer readable media, and a plurality of graphical user interfaces (GUIs) that may be used individually or in combination to produce technical benefits to users by providing them ways to visualize, interact, manipulate, and/or engage with datasets in ways not possible on a single user interface or not possible by merely connecting multiple interfaces or screens together. Virtual monocle interface systems may be configured such that users may engage higher order processing and analysis through the assistance of the visual and tactile senses.

In describing different embodiments of a virtual monocle interface system, certain terminology is utilized for the purpose of clarity. Such terminology is intended to encompass the recited embodiment, as well as any equivalents. Reference is made in the following detailed description of the embodiment to the drawings accompanying this disclosure. These drawings illustrate exemplary embodiments in which the invention may be practiced. It is to be understood that other embodiments may be utilized and structural changes may be made by one skilled in the art and in light of the disclosure, without departing from the scope of the claims of the present invention.

It must be noted that as used herein and in the appended calms, the singular forms "a," "an," and "the" include plural reference unless the context clearly dictates otherwise. Thus, for example, a reference to "a surface" includes a plurality of such surfaces, and a reference to "an object" is a reference to one or more information objects and equivalents thereof, and so forth.

System Introduction

The methods, devices, and systems disclosed herein are directed towards a multi-dimensional hierarchical displaying of information using two or more screens conjointly as a "virtual monocle interface system" that comprises multiple devices and multiple interfaces that work together to create a unified tool set for engaged user interaction with connected and related datasets.

A virtual monocle interface system may comprise two or more devices and corresponding device screens or interfaces for presenting content. The devices may comprise two or more distinct computer rendered graphical user interfaces (GUIs) configured for displaying the relationships between information objects using shapes organized within a multi-dimensional structure (e.g., 3D structure). The GUIs may be distinctly different from each other, presenting the same content in meaningful yet visually distinct forms. Forms, as used herein, may generally refer to one or more features of representing information objects. Three-dimensional view, for example, may be a different form of representation than flattened, two-dimensional view. Image is also a different form of representation than text. In some instances, two devices may each have a screen, and a first screen may act as a visual map of a network of information objects, while the second screen can act as a "monocle" in a sense that the second screen can provide additional context to the information presented on the visual map of the first screen. For example, if multiple layers exist in the data structure of the information, then the first screen may present a visual map of one layer of the information, whereas the second screen may be configured to present another layer of the information for a sub-set of the information presented in the first screen.

A virtual monocle interface system may comprise interactive electronic environments where users can engage with information represented as multi-dimensional information objects for various purposes, including, but not limited to, simplifying concepts, identifying or organizing new information, arranging or re-arranging existing information, obtaining insights from collected information, and the like.

A virtual monocle interface system may comprise interactive applications configured to operate the second screen, wherein the application can expand the field of view within or between multiple layers of information. Virtual monocle interface system applications may be configured for viewing information contextually on a secondary screen, while the primary (or the first) screen is still visible for the user.

A virtual monocle interface system may comprise databases, applications, computer readable media, and GUIs that may be used individually or in combination to produce a multi-dimensional environment for interacting with content in a dynamic way, and in a way that is not technically possible by using only one device or by merely combining display units to form a multi-screen unit. For example, while one GUI (e.g., a desktop monitor) may display a visual map of multiple information objects, another GUI (e.g., a mobile phone display)—which is interconnected via the virtual monocle interface system—may be used in conjunction to view other layers of an information object or hidden information, not directly visible on the desktop monitor.

Virtual monocle interface systems may comprise devices with standard electronic displays, monitors, or screens in two dimensional or two-and-one-half dimensional formats. Virtual monocle interface systems may be integrated into virtual reality enabled devices that may render the virtual monocle interface in what appears to the user and functions for the user as a three-dimensional virtual environment.

A virtual monocle interface system may comprise two devices, of which a first device may be configured for rendering a network view through a dimensional aerial display and a second device may be configured for displaying a flattened contextual display. In an aerial display, information objects may be displayed as one or more multi-dimensional structures comprising information objects that, to the viewer, appear to float in space with intersecting structure, shapes, edges, lines or other features, and/or convey intrinsic relationships within the content.

A user may engage with content in the dimensional aerial display through which the user may view the entire network of information objects and select a sub-network of information objects or an individual information object for investigation/analysis. The selected sub-network or individual component may then be displayed on a second device in a flattened contextual display wherein individual components or information objects are viewed relative to their local connectivity.

A computer rendered GUI for dynamic display, engagement, and organization of user selected content may comprise multiple planes comprising multi-dimensional information objects; for example, a first plane may include three-dimensional information objects, and a second plane may include two-dimensional information objects. In some instances, a plurality of edges may connect information objects in the first plane with information objects in the second plane. In some embodiments, a virtual monocle interface system may comprise GUIs comprising a timeline on one screen, and content selected from the one screen may be displayed on the second screen as historical events and fictionalized historical events. In further embodiments the first plane may represent historical events and the second plane may represent fictionalized historical events.

A method for representing content for simplified analysis may comprise performing multiple steps using a virtual monocle interface system. Steps may include selecting content from a database, displaying the content in a three-dimensional interface, sorting through the displayed content to curate, order, or select preferences; and distilling content into an optimized set of sub-objects. Such a method may be applied to selected or curated content, and/or data collected from a database that comprises content selected or extracted from one or more websites. In specific instances content may include cooking recipes, and the optimized set of sub-objects may comprise a grocery item shopping list required for those recipes. The selecting step may occur on one device, where the information is presented on a dimensional aerial display and then rendered on a second device where individual components or selected content is viewed in a flattened contextual display. In other instances, content may be viewed on the flattened contextual display and the user may rotate or select through the local items or sub-networks before electing to view the larger network connectivity in the multi-dimensional aerial display.

In some instances, a dimensional aerial display may be configured for displaying a network of information objects as 3D structures, with the 3D objects originating from content stored in a database. The database may comprise a plurality of records, wherein the records may be linked or related using a mathematical relationship that may be defined in a 3D space. In some embodiments relationships between concepts are depicted as a cityscape, with buildings and similar structures representing content as multi-dimensional information objects and floors within buildings as information sub-objects. Information objects may be connected by edges, lines, roads, or other architectural features. Users may engage with the interface by adjusting, traversing, and manipulating the views of information objects in the system, for example, using one or more types of user gestures. A virtual monocle interface system may further comprise a web-browser plug-in, for collecting and curating information, or for monitoring and/or recording a user's path though websites he/she has browsed for later access in a mapped or easy to navigate format. Selection of content in the dimensional aerial display may be rendered in another device and viewed on a flattened contextual display; alternatively, content selected on the dimensional aerial display may be viewed in the dimensional aerial display.

Content from various sources including websites and databases, may be accessed and stored as information objects. The virtual monocle interface system may be configured to retrieve/obtain and transform the content from various sources into information objects. The information objects may be connected spatially and presented using a coordinate system. The coordinate system may be used to establish or represent relationships between the information objects; for example, closely related content or information objects may be depicted spatially closer to one another (i.e., shorter distance between any two information objects).

Users may engage with content loaded in the virtual monocle interface system through movements including typing on a keyboard, clicking a mouse, moving a joystick, tactile feedback including gestures, eye movements that are tracked and auditory commands. A user may also execute functions such as optimization, estimation, and organization of information objects and data. A virtual monocle interface system may be integrated with other applications to allow the user to curate, monitor, organize, and/or analyze content from existing databases or sources. A variety of interfaces may be integrated into the virtual monocle interface system, and used separately or in combination.

Devices and Screens

A virtual monocle interface system may comprise two or more screens, wherein the screens may be of identical or different sizes, shapes, format, quality and the like. A first screen may be larger, equally sized, or smaller than a second screen. In further embodiments, the two screens may show different aspects or views of the same content. For example, the content may be depicted as a network, sub-networks or information objects with different aspects of the network displayed on different devices (e.g., two or more dimensional aerial displays, or two or more flattened contextual displays), in other instances the content may be displayed in different views, where content is represented using different aspects or features of the same body of content (e.g., a multi-dimensional aerial display and a flattened contextual display or any combination thereof).

A virtual monocle interface system may comprise two or more screens connected to one or more devices. Screens for displaying content may be physically connected to the same processing unit (e.g., in a dual-screen setup), or connected to separate processing units (e.g. one screen part of a laptop and another screen part of a user-operated mobile device). A user may interact with the screens using physical gestures. Screens may be touch screens, wherein the user may interact with one screen and corresponding changes may be visible on alternate screens.

A virtual monocle interface system may be configured to detect and respond to the movements of a user, the orientation of the device, or tactile feedback from the user. Such feedback may allow the user to move between content presented on a single screen or between displays on different screens. Movements of the user or orientation of the device may comprise tapping, shaking, flipping, accelerating, dropping, or otherwise moving the device. Tactile enabled mobile, desktop, or laptop environments may be equipped with touch sensitive displays. In these devices a virtual monocle interface system may be configured to engage with the user; examples of tactical engagement may include variations of user touch, including the degree of force applied by a user, the rate of tapping, directional motions or gestures including flicking, sliding in a particular direction, or orienting the device. Tactile engagement may be used to interact with, record, access, or change one or more features of an object depicted on the display or the settings for displaying information on the device.

In some embodiments, a first screen may be configured to display a broader network view of the content (e.g., multi-dimensional aerial display with different information objects and concepts displayed in a larger network) and a second screen may be configured to display a local network view (e.g., a flattened contextual display showing only a node and local or first-degree edges or connections). A user may switch between the displays, using the multi-dimensional aerial display to get a big picture perspective of the information—including the global structure and connectivity of information objects within the data set—and then selecting an information object of interest. The information object of interest may then be viewed on a second screen. The second screen may display specific details regarding the information object of interest, including its local first-degree connections.

Dimensionality and Virtual Reality

A virtual monocle interface system may support multi-dimensional formats or views. "Multidimensional" may refer to objects, elements, features, components, interfaces, formats, views and the like, that may be presented as one-dimensional nodes or structures in two-dimensions, two-and-one-half dimensions, three dimensions, or more than three dimensions. For example, "multi-dimensional" view may comprise a two-dimensional flat view, a two-dimensional view of a three-dimensional array (i.e., two-and-one-half dimensional view), a three dimensional array that can be rotated for viewing from various vantage points on a two-dimensional screen, or a three-dimensional view in a virtual reality environment. Using multiple dimensions or perspectives enables visual representation of mathematical relationship among critical information.

In mobile devices that are not virtual reality enabled, a virtual monocle may be configured to support user needs, and thus optimize the limited screen size of the mobile device. In these instances the complexity of the data may be distilled into a focused two-dimensional view that can be interacted with dynamically using touch sensitive features.

Complex information may involve a web of multiple relationships that may be represented in two-dimensional, two-and-one-half dimensional or three-dimensional forms. Information that is related in complex ways may be better understood when juxtaposed in a single view in the context of information interrelations. This information may be presented as information objects, which may include shapes with distinct features and physical orientations that convey context and meaning through their relative orientation, as well as through their visual features, presentation, and forms. Humans naturally organize objects, process them and compute spatial relationships among them in three dimensions; therefore, a virtual monocle that represents complexity with spatial organization that conveys significance and meaning may make it easier for a user to organize, and process complex information, thus enabling users to assemble content or navigate through the greater architecture and connectivity of information.

Virtual monocle interface systems may be used in combination with virtual reality enabled devices and systems to create interactive user experiences. A virtual reality enabled device may present a virtual monocle as a virtual reality experience. The virtual reality experience may comprise three-dimensional images that appear to be life-sized from the perspective of the user, and the virtual reality enabled device may be able to track a user's motions, for example head or eye movements, and correspondingly adjust the images of the user's display to reflect the change in perspective.

In some instances, a user may use a virtual reality enabled device with a graphics card, to render the virtual monocle. A virtual reality (VR) enabled device may be part of an altered reality or virtual reality enabled system. A VR enabled system may comprise any device or system comprising one or more features for head tracking, motion tracking, or eye tracking. A VR enabled system may comprise a head mounted display (HMD) with a device comprising a VR enabled virtual monocle. The virtual monocle may be configured to process information from external hardware or devices, or sensor containing objects, including sensors or sensory input from virtual reality enabled paraphernalia including head gear, goggles, gloves, suits, and other sensor containing units. A virtual monocle may also be configured for use with sensory enhancing devices or components including headphones.

Information Sources and Connectivity

Information may comprise structured data wherein a central component has one or more sub-components, and both central components and sub-components may be related in various ways. The central component or sub-components may comprise information objects.

Information objects may represent customizable content. The user may input information and data into the database using means of text input, or by uploading/downloading/synchronizing a catalog of directories, translated sound recording, news articles, web browsing, flagged items, to-do lists, or passive collection of actions or data. The personalized presentation and record may only be accessed by the user, or alternatively, can be accessed by any user. In still a further embodiment, the invention may save a memory of steps used by a user and relational network.

A virtual monocle interface system may enable a user, in certain embodiments, to display a first set or first information object onto or into a second set or second information object, whereby relational network connections found between the first and second information objects are determined. These identified connections are then presented to the user as relevant facts, suppositions, inferences, suspicions, assumptions, beliefs, deductions, or possibilities. These identified connections can also be mathematical relationships between the information objects.

Information in any of the disclosed virtual monocles may comprise a context array. Context arrays may provide structure and help determine the form of the display, priorities, activities, personal interests or preferences of the user. For example, the form of display may be dependent on the schedule of a user, screen capabilities, date and time of day, user identity, user selected primary context (e.g., the starting point or origin of the user's session), a pre-established list (e.g., recall, past search, new search), activity (e.g., on their device at the time of the session), planning (e.g., scheduled events or calendar activities), and/or the written or spoken words of the users. Other activities that may influence the form of the display may include a user entered specific string, such as an existing node name or a search string, a user's preferences, and the type of viewing device (e.g., smartphone, tablet, laptop, large monitor or multiple monitors).

User generated, curated, or collected data may be valuable but overwhelming if the user does not have the means to organize and engage effectively with the content. A virtual monocle may be tailored to collect and curate data, to direct user input, and/or to collect data including user generated content (e.g., through social media websites). Virtual monocles that support this need facilitate collecting, associating and engaging complex and multifaceted data by providing users with tools that help organize and identify connections with information that is encountered in a more pliable and dynamic way. Photos, videos, audio, daily news sources, or user generated content may be input, curated and cataloged in a relational database using a virtual monocle, with dimensional properties of the content used to represent shared features of the data. Examples of content may include content extracted from websites, user accounts from web services, content shared through social media, and content received from or sent to others such as e-mail.

The system may further facilitate collection of information that is multifaceted and resistant to linear organization. Multi-dimensional views and structural organization may facilitate a user's ability to gain insights and perform discovery or experimentation and thus gain clearer perspective on the content. Information and related data components may be represented as one or more multi-dimensional structures. In some instances, the information or units of information may comprise concepts, events, lists, people, places, things, directories, or any other forms of information. Edges may comprise any means of depicting connective, transitive or relational content between informational units. Edges may include, for example, lines or arrows. Users may be able to represent and organize content or concepts in three-dimensions (3D) or two-and-one-half-dimensions (2.5D) similar to organizing content outside of the virtual context, and/or use touch sensitive features that enable users to kinesthetically engage with content. A virtual monocle may comprise features and functions that enable a user to hide or reveal components of data, nodes, edges, clusters, plains or other single objects or clusters of objects or information.

Edges or lines in a virtual monocle may be colored or shaped to indicate the nature of the relationship indicated by a line connecting two information objects. For example, an edge may comprise a line or vector. The edge may indicate that information originating from one or more information objects share some relationship with one or more other information objects. In some instances, the degree of the relationship between the two information objects may be indicated by the length, width, diameter, color, shape, brightness, texture, transparency, brightness, contrast, movement, or modulation of any of these attributes, time of display, order of display, or other features that may convey or represent one or more important components of the relationship. Lines may be used with the method of the present invention to represent a plurality of types of relationships or relational networks, such as cultural, linguistic, genetic, familial, contextual, causal, sequential and other suitable relationship types existing between peoples, places, things, events, and ideas. Color, for example, and/or the thickness of a line may represent the different types of relationships that may be chosen by the user or by another user or an administrator, or the like.

Information Objects

Data or information may be represented as information objects. Information objects may be represented as multi-dimensional shapes, such as barrels, cones, cubes, cylinders, ellipsoids, polygons, pyramids, rectangular boxes, square boxes, revolved trapezoids, spheres, tori, trapezoids, or wedges. Information objects may represent a central information object organized as a hub with information sub-objects oriented around the central information object. An information object may be selected and expanded to reveal multiple sub-objects. Various features of the central component or sub-objects may be represented by the size, shape and/or the dimension of the sub-objects. For example, the dramatic significant of a character in a play may be depicted as a scalar relation to the height, diameter, radius, width, length, volume, surface area, color, texture, transparency, brightness, contrast, movement, or modulation of any of these attributes, time of display, order of display, or other features that may impact the visual detection of these information objects.

Data or information may be unitized and organized into collections of numerous information objects and/or information sub-objects, and the collections may be organized as a function of a particular shared variable (e.g., time or significance). In some instances, the numerous information objects or sub-objects may be associated with other information or sub-objects through one or more structural relationships. Associations between the data or information may be intrinsic, or already specified by the user, or they may be latent and awaiting pending affirmation by the user. The data or information may comprise sequential data, wherein content is related in a discrete order or relationship. In some instances, the order or relationship may be temporal. In instances where a temporal dimension is relevant to information objects, the objects may be presented along with or oriented with respect to a particular designated, or labeled, axis or dimension within the virtual monocle. In instances where the dimension is temporal, one or more points within a time range or time interval may be presented along an axis or a timeline with the position of time objects oriented in a sequence that corresponds to the temporal relationship between the objects, relative to the axis or timeline defined within the virtual monocle. Time intervals may comprise the past, the present, or the future. In some instances, data or information may be located or arranged on some other directional axis such as traversing a path through labeled points or defined intervals. In some instances, information objects may be displayed as layers, with respective orientation between the layers representing a relationship relative to a particular feature.

Information objects may be prioritized or organized with respect to a shared variable, order, sequence, or feature. These variables, orders, sequences, or features may include: newness (e.g., a recent arrival or current event relative to older arrivals or less current events), timely relevance or urgency (e.g., a reminder, alarm or deadline), degree of intrinsic interest (e.g., one of a chosen set of topics on which information is sought), linkage to other items of continuing prior interest including a new arrival or current event that is related to an existing interest, and a high rating or ratings by some general or specific group, including recommendations from trusted persons.

Virtual monocle interface systems may present information or content as an image with a series of multi-dimensional information objects (e.g., simple nodes, two-dimensional, two-and-one-half dimensional, or three-dimensional information objects). Information objects may be organized as a series of floating, connected, nested or latticed shapes. Discrete shapes or layers may be presented as substantially transparent, not transparent, or some combination or degree of transparency. The orientation of the information objects may be fixed into a dimensional arrangement with coordinates that convey additional information. Orientation (e.g., left to right, up to down, foreground to background) may convey a variable or common relationship, for example, time or significance. In other instances, the transparency of an object may convey information about time, relative relationships, significance, and the like.

A virtual monocle interface system may be integrated into a web browser that may enable users to easily perform functions, including estimation, classification, and optimization. Functions may be performed using data collected or selected from outside data sources. Outside data sources may comprise databases and websites the user has access to, has visited and/or marked or designated in some way. The content may have been assembled, collected, and stored by the user and/or compiled from items that the user has highlighted, underlined, or otherwise selected from individual websites they have visited or from websites that have been flagged.

A virtual monocle interface system may comprise applications that may be used to assemble catalogs of easily accessed information. For example, a virtual monocle may be used to assemble a cookbook that may be referenced based on ingredients that the user has in his/her kitchen or garden that the user has digitally catalogued. Alternatively, the user may use a virtual monocle to assemble a shopping list that may enable the user to cook the greatest number of dishes (e.g., a subset of selected recipes), using the smallest number of ingredients. A user may select and store a series of recipes in a database or flag/label (e.g., bookmark or otherwise call-out/distinguish) or select (e.g., highlight, cut/paste, etc.) content from a series of websites on the internet. The recipes and ingredients may be cataloged by an executable file configured to render content in the virtual monocle. The virtual monocle may present the recipes based on sub-objects (e.g., ingredients), metadata (e.g., the last time the user accessed the recipe), or user-supplied content (e.g., the last time the user made the recipe, and some metric for how much the user likes the given dish). The catalog of recipes may include for example, ingredient lists from one or more recipes or cooking websites. The system or virtual monocle may compile a single collected list of recipes and the corresponding ingredients for the given recipes. Users may use the virtual monocle to represent the recipes and the collective individual recipe components into a multi-dimensional array based on given features (e.g., the protein source in a dish, other classification including type of dish). Users may then assemble or collect the items in the list in accordance with their interest in a particular recipe. In further embodiments, the user may be able to use the interface to assemble and organize the recipes or ingredients in a multi-dimensional view, in order to create an optimal shopping list—for instance, one that would allow them to create the greatest number of their preferred recipes using the fewest number of items.

Interfaces

A virtual monocle interface system may comprise one or more interfaces (e.g., graphical user interfaces (GUIs), web-based user interfaces, command line interfaces) to represent or depict content to the user. Interfaces may represent and depict information in different ways, and may be used together or separately for different purposes. A user may be able to toggle between the interfaces, to use one single interface and hide other interfaces, or may be able to use multiple interfaces together as part of a single display or multiple displays. A virtual monocle interface system may use the GUIs or interfaces to present information accessed from one or more databases, applications, computer readable media or websites to a user.

Multi-Dimensional Aerial Display

Virtual monocle interface system may comprise a multi-dimensional aerial display, which resembles or depicts a multi-dimensional landscape for displaying information objects in 2.5D or 3D. Multi-dimensional aerial display may also be referred to aerial display in multi-dimensions or aerial projections in multi-dimensions. In a multi-dimensional aerial display, one or more information objects may be depicted as floating in space within an arrangement, structure, or architecture (e.g., web, lattice, matrix, network, cityscape, etc.), such that the structure and orientation between information objects conveys relative or relational meaning. Information objects presented in a multi-dimensional aerial display may or may not be connected. For example, information objects with related or relevant information may be shown with an edge or edges connecting one or more other information objects. Edges may depict a broad range of information regarding the connectivity of the information objects.

A multi-dimensional aerial display may comprise a feature that allows the user to navigate and trace paths or elect to stop at a particular object or edge to better examine specific details or relationships. A user may be able to follow a path from object to object in a pre-set order established by outside information including user selected, user generated or trained content, which navigates through the structure formed by information objects, sometimes following existing connections and sometimes not. The structure of a multi-dimensional aerial display may be intrinsic to the information objects and their positioning; the structure may also be user assigned, or designated by information from outside databases, content or sources.

The overall architecture and relative relationships among information presented by the information objects may be illustrated by the spatial organization or connectivity of information objects in a multi-dimensional aerial display. In some instances, the structure may be related to a layout above a virtual grid, beneath a virtual grid, behind a virtual grid, and/or on other sides including in front of one or more of the information objects. In some cases, the structural depiction of relational data between the information objects may consist of markings on a transparent plane; it may be possible to view inside information objects or virtual grids.

A multi-dimensional aerial display may comprise a two-dimensional, two-and-one-half-dimensional, or three-dimensional surface with concepts presented as multi-dimensional information objects. In a two-dimensional view, a multi-dimensional aerial display may be viewed from a broad range of orientations or perspectives, from any dimension or angle, from inside or outside the information objects. Information objects may comprise a collection of transparent, partially transparent, or non-transparent information objects. The information objects may be arranged into a latticed pattern or web, a parallel set of planes, a hierarchical tree, concentric nested information objects, or other topographical configurations. In some examples, the topographical arrangement can be viewed from the zenith, wherein the arrangement may be represented as a crystalline-like latticed structure or web, a stack of planes, or a three-dimensional tree with leaves and branches; it may also be represented as a set of single-layer views, each two-dimensional, through which the user may navigate vertically. In a two-dimensional display of a three-dimensional image, an image from any vantage point may be depicted as a two-dimensional representation. In a three-dimensional view in virtual reality, the user may view the structure from any vantage point or navigate through the structure.

FIGS. 1-6, 7A-7B, and FIG. 9 illustrate various forms of visualization available for the virtual monocle interface system, on one or more of its multi-dimensional, multi-screen graphical user interfaces. The user can choose one or more of the various forms and styles of visualizations described herein, and may also switch among them based on the user's preferences and other factors also introduced herein. If one display unit and graphical user interface adopts one form of visualization, the other display unit or the other graphical user interface may adopt another form of data visualization. The combination of different visualization forms and methods may be adjusted or customized based on the underlying content or the needs of the user, for example.

FIG. 1 illustrates a virtual monocle comprising a three-dimensional aerial display (110) with a three-dimensional or virtual grid (105) used to indicated the connectivity between a heavily weighted concept (115) related to or connected to a less heavily weighted (120) and several low weighted—small or ancillary—concepts (125). The heavily weighted concept (115) is shown as connected to the less heavily weighted concept (120) through an edge (130), wherein edges can be depicted as lines or arrows. The weighting of the concept is directly related to the diameter of the information object used to represent the concepts. In some instances, weighting may represent the significance of a particular concept, with larger dimensions correlated with greater significance and smaller dimensions correlated with less significance. Significance may be determined by features selected by the user (e.g., the number of sub-objects within a concept), or may be based on the user's interaction with the various information objects. In other embodiments, weighting may represent the rating(s) or selection(s) made by the user. In yet other embodiments weighting may be dictated by the recurrence of the concept or the significance of a concept to another variable (e.g., time). A three-dimensional aerial display may be reordered or reassembled, in response to a change in selected features. For example, FIG. 1 may depict the significance of information objects (115, 120, 125) relative to the $19^{th}$ century resulting in a first information object (115) having more significance (e.g., greater weighting and larger dimensions) than a second information object (120). A user may change the aerial display settings to indicate the $21^{st}$ century resulting in the second information object (120) having more significance and thus greater weighting and larger dimensions than the first information object (115). In some instances, changing the setting may also change the connectivity of the information objects, for example, resulting in the disappearance or appearance of edges (130).

A multi-dimensional aerial display may comprise a graphical map of information objects and relational information that the user may interact with in space. The information objects may be collected and arranged according to their relationships; for example, information objects may be represented as nodes and two or more information objects may be connected by edges, such that the edges convey information.

A multi-dimensional aerial display may be rendered on any sized screen, of any electronic device (e.g. mobile device, tablet, computer monitor, laptop monitor, desktop monitor, television). In some instances, it may be rendered on multiple screens and/or on multiple devices (135). A user may use gestures, touch, forces of touch, rate of touch, mouse movements or clicks, joysticks, arrows, or other means of moving networks, sub-networks, information objects or other components around.

A multi-dimensional aerial display may be used to retrieve data and records from a database. Retrieved data may be used to establish relationships between data and records by using a multi-dimensional aerial display to connect the data and records. In still another embodiment, information, data, records, lists and the like, may be input by the user and not be modified by another user. In the alternative, the inputted information, data, records, lists, and the like, may be curated and moderated or modified by another user. In other embodiments a multi-dimensional aerial display may be integrated into software systems for collecting, analyzing, and procuring information relative to mathematical relationships or user preferences.

Flattened Contextual Displays

A virtual monocle may comprise a flattened contextual display. A virtual monocle may refer to the one screen or a device, among the multiple displays/screens of the virtual monocle interface system, which is configured to visualize information objects in a differentiated manner. The flattened contextual display of the virtual monocle may be configured for presenting details of a particular data set, including the content of a particular object or edge, the connectivity or relationships between data, the temporal arrangement of the data and/or an attribute of the displayed data. A virtual monocle provided herein comprises at least one first object located on at least one surface, and at least one second object located on at least one surface, and at least one line wherein a first endpoint of the line is associated with a first object and a second end point of the line is associated with a second object, and wherein the line represents a relationship between information objects. A plurality of information objects and lines represents a relational network and may be defined by a mathematical model.

Figure 2:
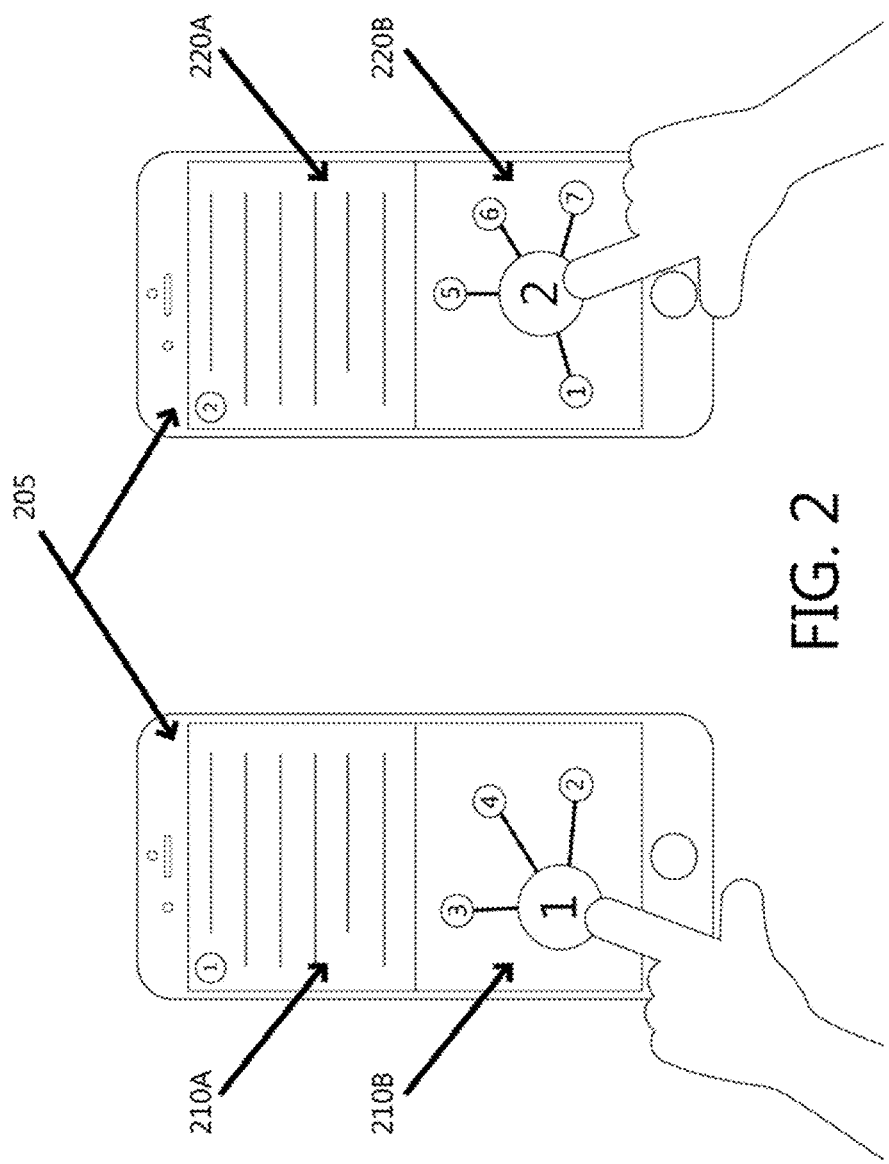
FIG. 2 illustrates a mobile application with a flattened contextual display.

FIG. 2 depicts a mobile device (205) with a virtual monocle as described herein with a flattened contextual display. The virtual monocle illustrated here can be part of the virtual monocle interface system, and the virtual monocle may be used in conjunction with the display illustrated in FIG. 1. FIG. 2 illustrates an example of a flattened contextual display for one or more information objects, the information objects which have been illustrated in FIG. 1. Information object "1" may comprise written details regarding object "1" in the top part of the screen (210A), and the connectivity of information objects represented as two-dimensional shapes in the lower part of the screen (210B). A user may select object "2" by depressing, touching, flicking, or any detectable gesture on the screen or on the location of the screen where object "2" is displayed, and the information objects may reorient resulting in details for object "2" appearing in the top of the mobile device screen (220A), and the connectivity for information objects connected to object 2 being depicted on the lower part of the mobile device screen (220B).

Virtual Monocle with Flattened Contextual and Multi-Dimensional Aerial Displays

The disclosed virtual monocle may comprise one, or both of two primary perspective displays: flattened contextual and multi-dimensional aerial. These two displays serve for perspective, and assist a user to monitor, organize, and preserve complexity in an orderly way and to navigate through the complexity. The two different displays may be configured to support different visual functions to solve the technical challenge of displaying complexity on limited display space. A flattened contextual display may be configured to enable the user to look into one or more concepts when screen space is limited and/or when the user wants more detailed information. A flattened contextual display may have various formats, ranging from compact for a cell-phone, restricted to the corner of a larger screen, or expanded to an extended or full screen display. In some instances, the format of the display may be influenced by the ratio of the number of items in the subset with qualifying priorities to the display area available. In some embodiments, a multi-dimensional aerial display may be configured to comprise a larger visual span than a flattened contextual display. A multi-dimensional aerial display may show items within a stable structure, and enable the user to highlight or select information objects when appropriate. A multi-dimensional aerial display may be configured to retain the structure and connectivity of particular objects or contents and in other instances a multi-dimensional aerial display may be configured to display the concepts for arrangement by the user. A multi-dimensional aerial display may benefit from screen space, allowing the larger architecture of a concept or the connectivity of information objects in a virtual monocle to be viewed as a larger landscape or topography.

A flattened contextual display and a multi-dimensional aerial display may be juxtaposed in different ways. They may be shown side-by-side on a split screen. They may alternate on a full screen. A flattened contextual display may be shown as a small rectangle or other shaped region in the corner of an image. A flattened contextual display can appear on the screen while the larger multi-dimensional aerial display appears in virtual reality. A flattened contextual display may appear in the lower foreground of a virtual reality view that focuses on an item selected in a multi-dimensional aerial display.

A flattened contextual display may present information about concepts in a pop-up style format for users to gain more detailed insight into the content. The combination of a multi-dimensional aerial display and a flattened contextual display allows a user to review the topography and relational organization of information, as well as the specific details and relational content of information objects. Virtual monocles may be set to display information objects with respect to given variables, for example as a function of time.

An object or item may be selected either in a flattened contextual display or a multi-dimensional aerial display, resulting in the object or item also being selected in the other view. An object or item can be expanded in either view, and when this is done its sub-objects and range of connections may be emphasized in both views. A flattened contextual display may be configured to provide a prioritized view of a knowledge base, and to facilitate navigation from any selected object down into its sub-objects or out into the expanded network directly connected to that object. A flattened contextual display may extract and present relevant material for display while excluding other elements that might be nearby but are not included in the relevant material. A multi-dimensional aerial display may highlight the same selected individual or set of items without changing their positions within the overall display. In further embodiments, a virtual monocle may be configured such that navigation through a multi-dimensional aerial display may be possible from multiple perspectives, orientations, or views. For example, a user may view the items from any outside perspective or surrounded by it, but when a viewer enters into the expanded network of an item only that network may be visible. While navigating through either display a user may have the option to jump to the same position in the other view e.g. if in a multi-dimensional aerial display then jump to a flattened contextual display, and then continue navigating. A user may insert a new object in either display, and both displays may be updated to position the new object accordingly.

In some instances, a multi-dimensional aerial display and a flattened contextual display may comprise complementary features. A multi-dimensional aerial display may present a broader range of items allowing one or more components, including a set of components, to be highlighted, in the setting of their position within the overall display. Expansion of a selected item may occur in a flattened contextual display, where a flattened contextual display extracts relevant material for display while excluding other elements that might be nearby but are not included in the relevant material. When a user navigates through a multi-dimensional aerial display, the user may enter into the structure and be surrounded by it, but when a viewer zooms out only the expanded network may be visible. A user navigating through either display may have the option to jump to the same position in a different view (e.g. from a multi-dimensional aerial display to a flattened contextual display or vice versa) and continue navigating. A user can insert a new object in either display, and the other display, a multi-dimensional aerial display or a flattened contextual display, may be updated to position the new object properly or in an equivalent location.

Figure 3:
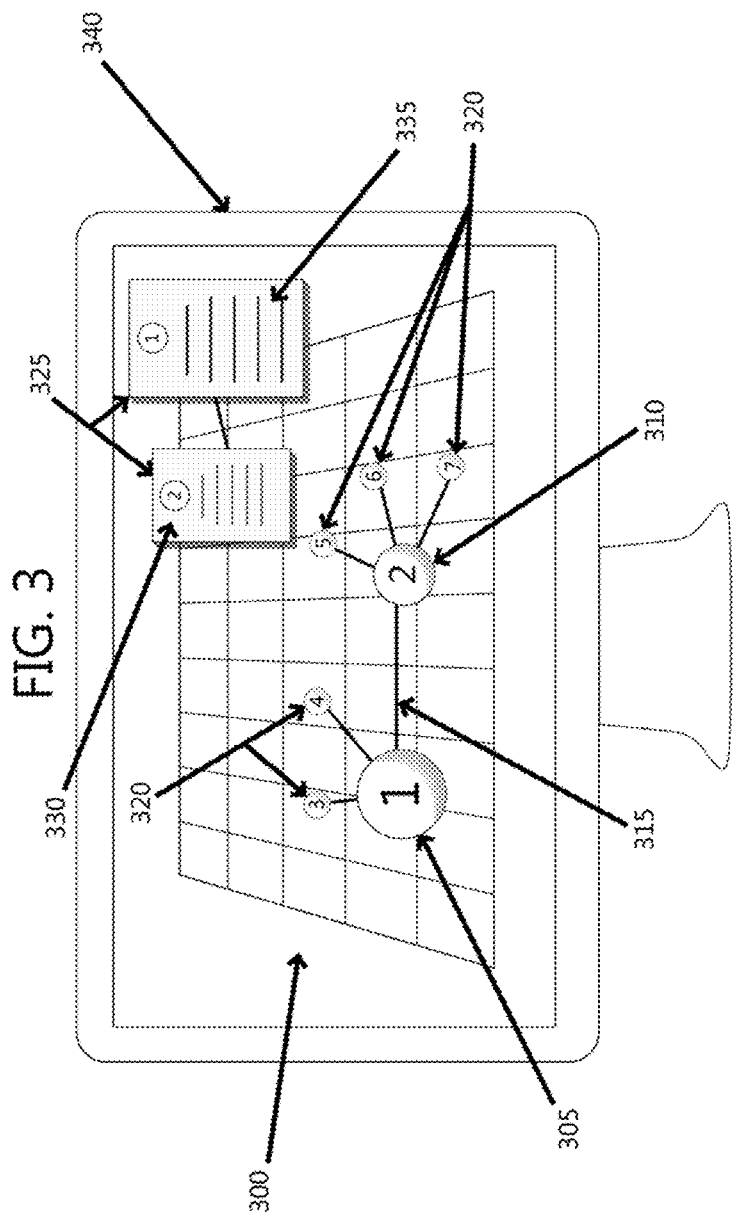
FIG. 3 illustrates a multi-dimensional aerial display with flattened contextual display providing content for components selected from a multi-dimensional aerial display.

FIG. 3 depicts a virtual monocle interface system as described herein with a combined multi-dimensional aerial display and flattened contextual displays. A multi-dimensional aerial display (300), as also depicted in FIG. 1, facilitates the presentation of the overall architecture and topography of information objects representing content, and the connectivity between the information objects. In this depiction, there are two large heavily weighted information objects, object "1" (305) and object "2" (310). Less heavily weighted information objects "3," "4," "5," "6," and "7" (320) are also represented with their corresponding edges connected to heavily weighted information objects "1" (305) and "2" (310), which are connected with an edge (315) as well. In this embodiment, a multi-dimensional aerial display takes up a majority of the screen. Object "1" (305) is selected and thus highlighted, while the remaining concepts are not highlighted. The flattened contextual display is presented in the upper right-hand corner of the screen (325). The flattened contextual display in this embodiment comprises two boxes, one that presents detailed information regarding the object highlighted in a multi-dimensional aerial display, object "1" (335), and a second box, which is more recessed, that presents information regarding the largest most strongly weighted object in a multi-dimensional aerial display, object "2" (310). The most prominent box may be configured to present information regarding the object highlighted in a multi-dimensional aerial display, and the recessed box may comprise information that is selected from any components depicted in a multi-dimensional aerial display, information that is selected from components not depicted in a multi-dimensional aerial display, or information from outside resources, previous sessions, or other sources of content. The information depicted in the recessed screen may be selected based on user settings or automatically selected based on content or information provided by the user or extracted from outside sources.

A virtual monocle may be rendered on any sized screen, of any electronic device (e.g. mobile device, tablet, computer monitor, laptop monitor, desktop monitor, television). In some instances, it may be rendered on multiple screens and/or on multiple devices (340). A user may use gestures, touch, forces of touch, rate of touch, mouse movements or clicks, joysticks, arrows, or other means of moving networks, sub-networks, information objects or other components around.

Figure 4:
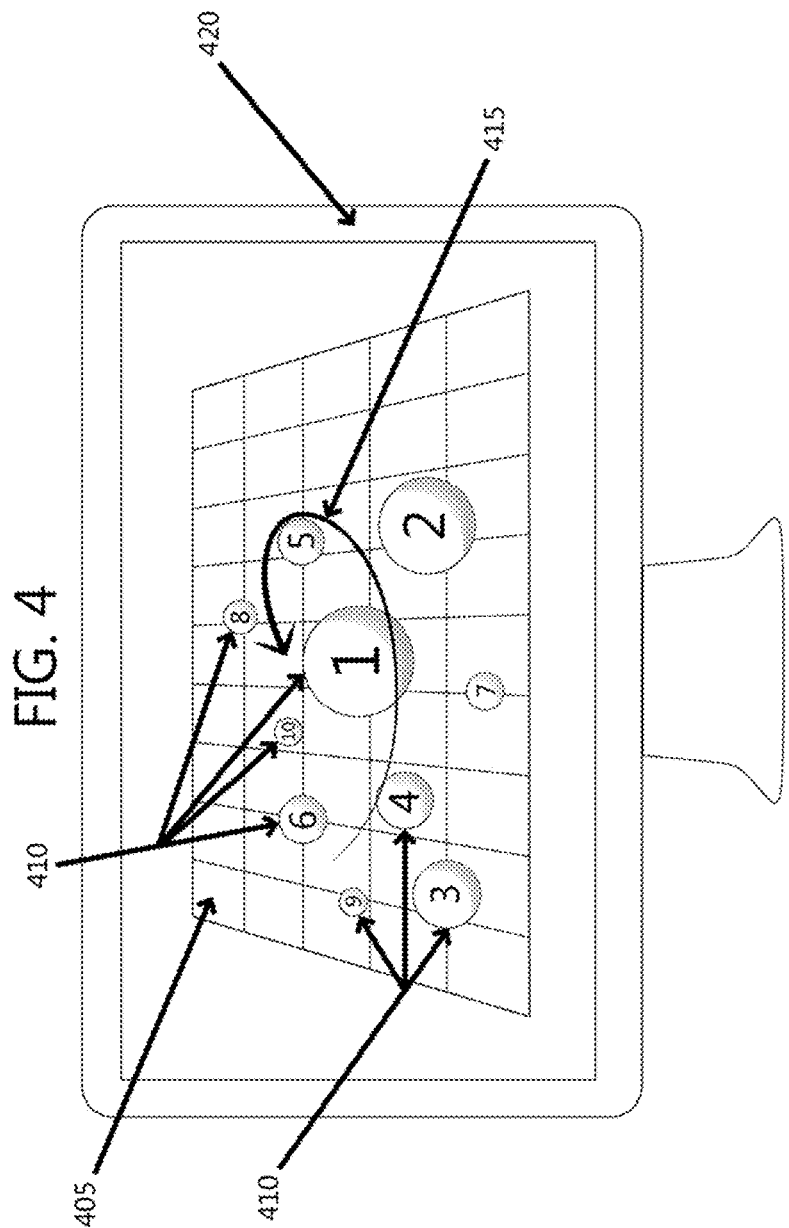
FIG. 4 illustrates a multi-dimensional aerial display in free-floating mode with a swirl feature.
Figure 5:
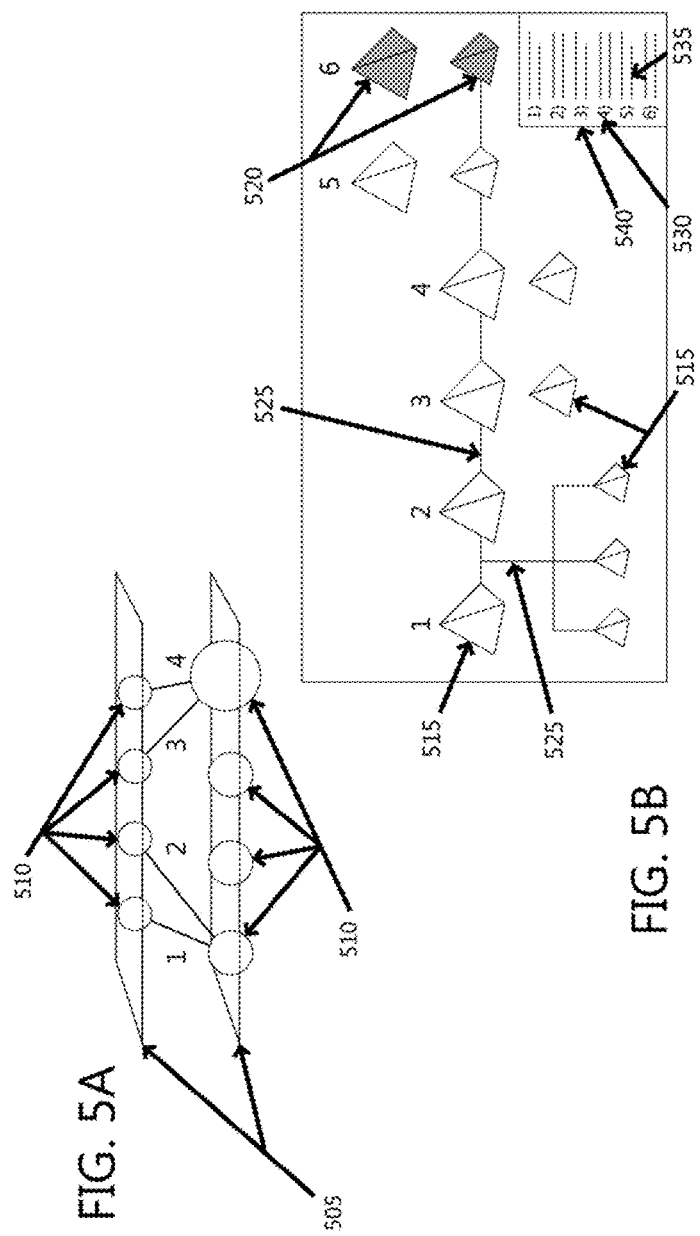
FIG. 5A illustrates a multi-dimensional aerial display in planar mode.
FIG. 5B illustrates a combined multi-dimensional aerial display and flattened contextual display in taxonomy mode.

A user may be able to dynamically interact with the different components of the planes depicted in free space. In a multi-dimensional aerial display or a flattened contextual display, structure may be oriented, rotated, moved, stretched, shrunk or otherwise structurally manipulated. As shown in FIG. 4, a user may be able to view concepts that are not connected or are shown without connections (410), and use gestures, touch, a mouse, keyboard or other means to swirl (415) or move the concepts around. The term "swirl" is used here to define a gesture that results in the movement or motion of objects, for example similar to the way ice cubes could be swirled around in a drink. In some instances, the concepts or information objects may be represented in a virtual reality environment as 3D information objects or in 2.5D with a background or shadowing that illustrates the dimensionality (405). A user may click on any of the information objects or edges and review information or content related to the information object in a flattened contextual display. Examples of information that may be depicted in this format include events that occurred over time.

A virtual monocle interface system may be configured to render visualized information on any sized screen, of any electronic device (e.g. mobile device, tablet, computer monitor, laptop monitor, desktop monitor, television), or through any image generating device that may not rely on a screen. In some instances, it may be rendered on multiple screens and/or on multiple devices (420). A user may use gestures, touch, forces of touch, rate of touch, mouse movements or clicks, joysticks, arrows, or other means of moving networks, sub-networks, information objects or other components around.

A virtual monocle interface system may provide multiple perspective displays. The disclosed virtual monocle may comprise one, or both of two primary perspective displays: a dimensional aerial display and a flattened contextual display. These two displays may provide visual representations or perspectives that enable users to organize complexity in an orderly way and to navigate through complexity. There may be two different views because they support different mental/visual functions. In some instances, they may solve the challenge of displaying complexity in a small display space using different complementary strategies, and in further embodiments a virtual monocle may be configured to alternating between strategies. A dimensional aerial display may show items within a stable structure, highlighting selected items of that structure when appropriate. In some instances, a dimensional aerial display may show these items without changing their arrangement. A dimensional aerial display may benefit from larger screen space, because the structures (e.g. information objects or networks of information objects) that are shown may be more clearly seen. A flattened contextual display may have various formats, ranging from compact (for a cell-phone) or the corner of a larger screen, to a larger form factor suitable for full-screen mode. The flattened contextual display format may be influenced by the quantity of information objects or the connectivity among them. For example, the number of items in the subset and/or qualifying priorities of the content may impact the area allotted for a flattened contextual display.

A dimensional aerial display may comprise a planar display, with sub-objects of a larger body of information presented as information objects within a plane that represents the body of information, as shown in FIG. 5A. Information objects representing one concept may be depicted on one single plane and information objects representing another concept may be depicted on a second plane, edges may be used to depict connections between information objects shared between planes. In the planar display, information or concepts may optionally be interpreted or presented as an image of multi-dimensional information objects (510) embedded in one or more planar layers (505), wherein each layer represents a form of relational information e.g. one body or set of content. In alternative embodiments, which do not use a planar display, the connectivity between dimensional information objects may be shown using lines, spatial organization and/or other means as shown in FIG. 5B. In FIG. 5B the information objects comprise pyramidal shapes of different sizes (515) connected through edges or lines. Some of the pyramidal shapes are colored or shaded (520) to signify features of the content or information represented by the object.

Information objects depicted in a dimensional aerial display may be numbered, as shown in FIG. 5B with the numbers (1, 2, 3, 4, 5, and 6) located above the objects at the top of the screen. Numbers, including reference numbers that may function as references to content in a flattened contextual display, may hover as multi-dimensional elements above the information objects to which they correspond. Numbers e.g. reference numbers may float within the information objects or be connected with the information objects using lines. Numbers (530), letters, titles, descriptors, images, icons, colors, shading differences, or other features of the object or labels applied to the object may be used to reference information objects represented in a dimensional aerial display with content (535) or information represented in a flattened contextual display (540).

A dimensional aerial display or a flattened contextual display may comprise information objects connected through edges, which allow concepts with one or more components to be compared with a related concept that also comprises one or more components. Edges, as shown by numbered edges 1, 2, 3 and 4 in FIG. 5A and labeled edges (525) in FIG. 5B may be used to connect related content between different planes. Edges may comprise lines or vectors may visibly connect one or more information objects together into a relational network of information, and/or information objects on the same surface, plane or dimensional structures.

Cityscape Interface

Figure 6:
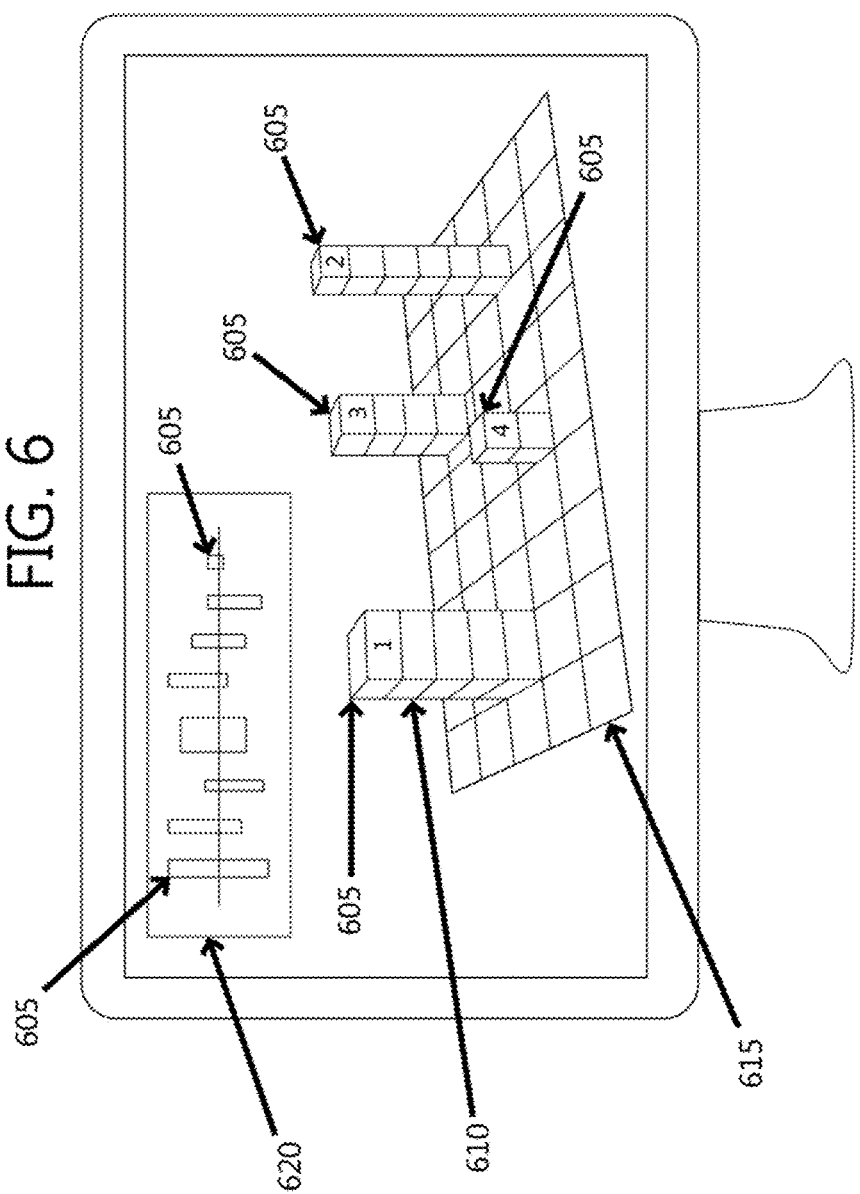
FIG. 6 illustrates a cityscape display mode.

Virtual monocle interface systems may present information objects in any structural format that appeals to the user, such as the buildings in a traditional town, the rooms of a cruise liner or resort hotel, or the towering skyscrapers of a city, In the cityscape format, as depicted in FIG. 6, cityscapes may comprise buildings (605) with floors (610). The buildings may represent larger bodies of information, where information content comprises one or more sub-objects that may be arranged as floors or layers of the building. The orientation of the layers or floors within the building may be arranged in an order that represents a relationship between objects and the sub-objects of the larger body of information. In some instances, the sequence or order of information represented by the floors within each building may be established by the user, or through user settings. In alternative instances, the sequence or order of information represented by the floors within each building may be established randomly or through a pre-set mathematical equation or relationship. In some instances, the height of the building may be correlated with the number of floors and/or the amount of sub-objects contained within the larger information object.

A virtual monocle interface system may comprise a cityscape feature that allows users to build content or information into a city or cities. A cityscape may display content in the form of a skyscraper, towers, and buildings with multiple floors. The virtual monocle may present selected information or content by placing it in information objects represented within the city. Cityscapes may comprise a two-dimensional format (620), two-and-one-half dimensional, or three-dimensional (615) formats. In some instances, a three dimensional or two-and-one-half dimensional format may be represented in a dimensional aerial display (615), and a two-dimensional format may be presented as part of a flattened contextual display. Users may be able to select buildings or floors represented in a dimensional aerial display and view the selected component in a two-dimensional format with information as presented in FIG. 3, with the two-dimensional representation (620) on one part of the screen and information about a selected building or floor on another part of the screen. A dimensional aerial display may comprise a building or floors that may be selected such that information or details regarding the information represented by the information object are presented in a flattened contextual display, as presented in FIG. 2.

A user may build a custom virtual city, or select from one or more existing cities. In instances where a user builds a custom city, the user may elect the proportions or scale of the information objects (e.g. building, floors, roads, etc); this may allow the user to establish a dynamic range for analyzing a set of content that is particularly relevant to a particular feature or variable, and/or to examine the particular subset of concepts that are important to the selected range.

A cityscape may comprise information objects, and a user may elect to display one or more information objects within the cityscape using buildings or features that exist in any number of cities around the world, to represent specific content or information. Examples of buildings or city features that may be user selected may include well known landmarks (e.g. the tower of London, Empire State Building, Eiffel Tower, etc.). A virtual monocle system may organize and assemble user selected content such that it is normalized to the respective size of the building or buildings selected by the user.

The cityscape may be dynamically activated to create an engaging display for the user. For example, the user may elect to highlight a particular feature of the data, (e.g. the time at which a particular event occurred), and information object or information sub-objects related to the particular feature (e.g. the time) may produce a visually engaging action (e.g. light up, flash, or perform some other detectable response). In some embodiments, a user may walk, drive, float, fly or use other means of transportation to move through the cityscape. While moving through the cityscape, the user may click or engage with the content using a flattened contextual display. A flattened contextual display may provide details relevant to the one or more information objects, including information objects that have been selected by the user. Collectively, the dynamic features may provide the user with a tool or tools for illustrating the connectivity between different information objects (e.g. buildings) or sub-objects (e.g. floors) and displaying the content interactively between complementary yet distinct and different interfaces and devices. A user may "build" a cityscape from his/her preferences. For example, the user may create a city plan that represents the aspects of the user's life that the user wishes to obtain new information about. For example, the user may construct a skyscraper, with multiple floors each representing an aspect of the user's work life. For example, if the user is a technology executive at a semiconductor manufacturing plant, then the user may arrange the skyscraper such that different domains of the user's work interests are presented as individual floors. The user may have floors that represent manufacturing, semiconductor industry, management, leadership, governance, and semiconductor stock performance, and each may be configured to receive news items relevant to that floor from news sources that the user is interested in. Within a given floor the user may create other information objects that can be arranged, with each information object representing different aspects of the content relevant to the particular floor. The user may modulate the size, shape, identity, or other aspects of the information object, allowing the user to indicate the degree of personal significance of the information object. Within the same city, a user may construct a house, which can represent an information object. The house may comprise rooms, and the rooms may represent various interests of the user relating to his or her family. For example, if the user has children and the user is interested in the performance of their children's sports teams, the user may subscribe to news feeds that provide that information, and represent such information in the virtual monocle interface system in rooms of buildings or houses.

Dynamic Display of Contextual Information

Figure 7:
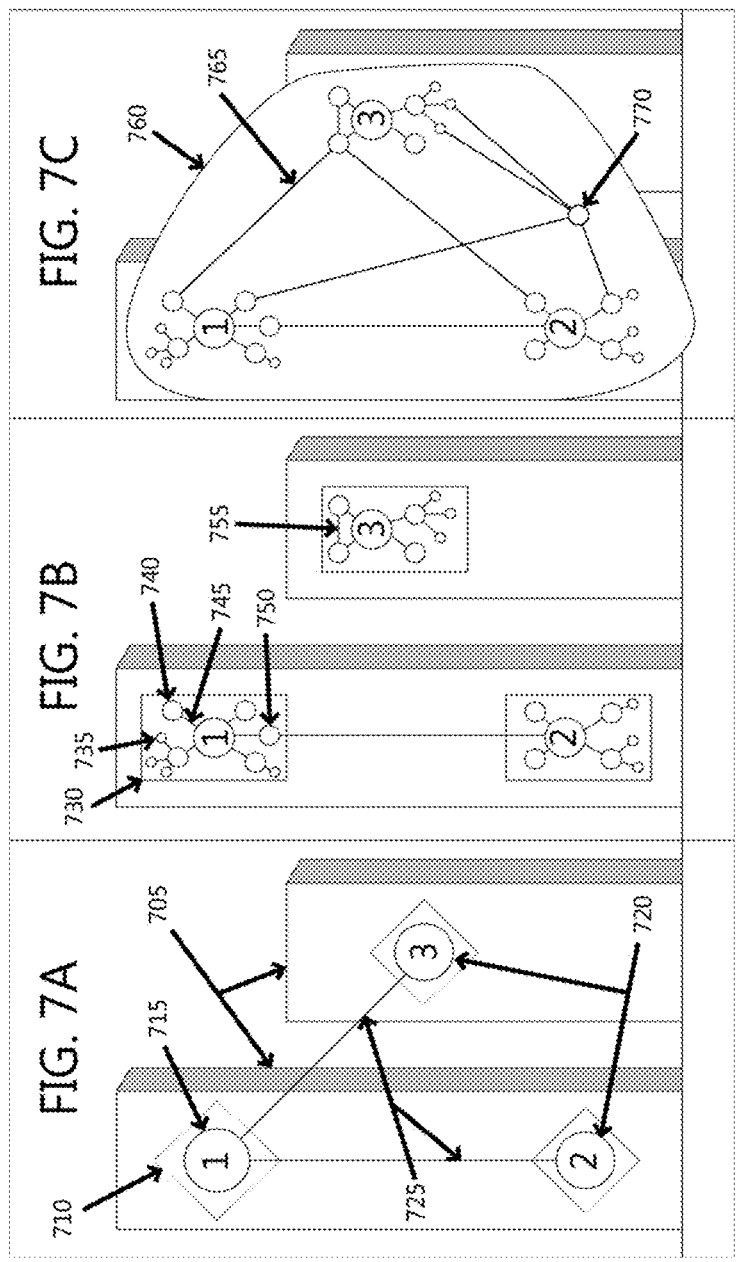
FIG. 7A illustrates aerial display in selective examination mode.
FIG. 7B illustrates aerial display in selective contextual examination mode.
FIG. 7C illustrates aerial display in contextual cohesion mode.

A virtual monocle may have multiple options for dynamic display of related contextual information in response to a context or request for context established by the user. A context may specify a subset of information objects or sub-objects to be examined. A request for context may take advantage of specific contexts defined in the dataset, knowledge base, or elsewhere in the virtual monocle interface system. A request for context may also involve a search for a term or image, a filtering request that selects for certain attributes while ruling out other attributes, a sorting request that orders items to bring the most relevant items to the top, or an advanced request that combines sorting, filtering and sorting operations in a predetermined sequence and makes provision for logical operations on the information. The dynamic response takes place in the dimensional aerial display, and makes visible for examination and access information sub-objects that satisfy the request while preserving the positioning of the information sub-objects within the structures of information objects. The three panels in FIG. 7 illustrate one embodiment of dynamic response, with four steps. In the first step, information objects that contain specified or requested information sub-objects are brought into the foreground. In the second step, the information objects open up or become transparent so that the requested sub-objects become visible and accessible. In the third step, local contexts of requested sub-objects become visible and directly accessible. During these first three steps, the positioning of the sub-objects within their information objects is preserved, so that the structural properties of the information objects such as sequences in time or proximity in space can be exploited in the usual ways. Finally, in the fourth step structural properties of the information objects become invisible, so that complex interrelationships among information items can be clearly displayed.

FIG. 7A illustrates an aerial display in examination mode. The figure illustrates the first two steps in dynamic response to a request for contextual information by the user. In an example, the user may initially select information object 1 (715) and request context information related to the information object 1. The context information request relating to that information object 1 can be satisfied by the display of information objects 2 and 3 (720). These information objects are found as sub-objects within two respective information objects, wherein the two information objects are displayed as cityscape towers. The first step in selective examination mode is to relocate these two information objects into the foreground (705). The second step in selective examination mode is to open up the structure (e.g., the cityscape towers) and contents of the information objects so that each information sub-object is visible and accessible. An opening (710) for the selected information object 1 may disclose the information sub-object within (715) another structure. Opening may refer to exposing, highlighting, or displaying an information object, which can part of another information object. In the given example, an opening in the cityscape tower structure exposes the information object 1, which is internally located within the tower structure. Also, openings for the related sub-objects disclose the other information objects (720). Connections (725) between the selected information object 1 and the related information objects 2 and 3 depict the relationship between them, as determined by the user's context request.

FIG. 7B illustrates the third step, an aerial display in selective contextual examination mode. Selective contextual examination can extend selective examination. Selective contextual examination can be a dynamic response to a user's request to examine and access local context. The opening expands (730) to depict the local context (735) for each selected information sub-object. Local context includes related information sub-objects (740) and connections (745) linking related sub-objects to the selected sub-object. The nature of the context may or may not be strictly hierarchical, and there is no requirement for a strict hierarchy (a tree-structure or linear outline) in the dimensional aerial display. For example, a sub-object (750) may be relevant in the contexts of two selected information sub-objects, and two related sub-objects within a context may be directly connected to one another (755).

FIG. 7C illustrates an aerial display in contextual cohesion mode. The user may request this mode in order to inactivate the display of structural positioning within information objects, so that the display focuses on context alone and is determined by the coherence among contexts (at any time the user can reactivate structural positioning within information objects). In an embodiment, contextual cohesion mode is depicted as a foreground display (760). Additional information includes connections between local contexts (765) as well as related information objects (770) that reside in information objects other than the two original depicted (705). Contextual cohesion mode is particularly useful when the various connections among contexts are complex or when overlapping contexts bring in information sub-objects from various disparate information objects.

Data Retrieval and Engagement

A virtual monocle may have multiple options for retrieving and presenting information stored in a database or databases, and may more expansively inform and educate the end user about the information related to a query generated by the user. A dimensional aerial display or a flattened contextual display may comprise a plurality of information objects, such that each information object may be selected by the user. The user may select two information objects, whereupon a dimensional aerial display or a flattened contextual display may visually or audibly present to the user the relationships and connections existing between the two selected information objects. In some instances, both connectors (edges) and information objects may appear in response to user selection. In some instances, selecting one or more information objects or edges connecting information objects, may result in display of a phrase, an identifying image, an icon with a shape on which the label appears, a screen with text descriptions, and/or a screen with image and text descriptions. In some instances, when a network of information objects is very large and information objects and connectors within the network reach a threshold, then the foreground may display results, and a subset of qualified information objects may be cycled through in the background. In further embodiments, items within the network that have lesser priority may appear for a shorter time and/or in a less significant way.

When an object is selected from a flattened contextual display, the display may open to depict a full network of connections, which extend away from the selected information object like a network or web. This same network may be simultaneously displayed in a dimensional aerial display, but indicated by highlighting without changing position relative to a dimensional aerial display as a whole.

Desktop Integration and Browser Plug-Ins

Figure 8:
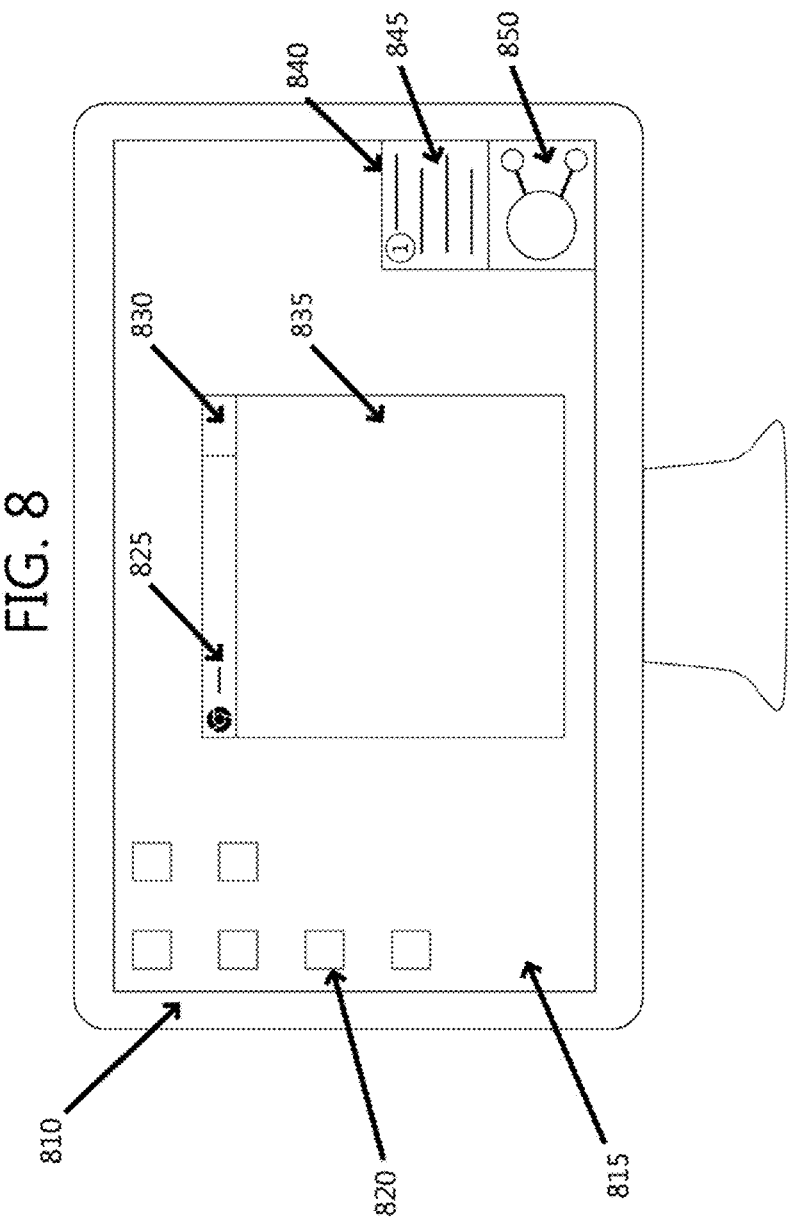
FIG. 8 illustrates flattened contextual display on the desktop of a computer, with optional web browser integration.

A virtual monocle may be integrated into a desktop working environment, and/or applications including, but not limited to, mobile applications, desktop applications, web browser plugins, and the like. FIG. 8 illustrates a desktop monitor (810) with a working desktop environment (815) and application icons (820). In the lower right-hand corner of the screen is a flattened contextual display (840) with content and description (845) for selected information objects (850) also depicted in the flattened contextual display. In this embodiment, a dimensional aerial and a flattened contextual display may be run from an application running on the operating system of the desktop computer. A dimensional aerial and a flattened contextual display may comprise a website browser plugin (830). Website browsers tool bar (825) that make use of the plug-in may include Chrome, Internet Explorer, Mozilla Firefox, Safari, or any other website browser tool. The plugin may be integrated into a web browser for navigation through websites in the World Wide Web. Content viewed in the website browser window (835) may be selected and saved or stored within a directory, on a hard drive, or on a cloud drive, for viewing and interaction within a dimensional aerial or a flattened contextual display. In other instances, a plug-in may be used to automatically track or record the history of the websites visited by the user in real time. In further embodiments, the website history may be dynamically represented as information objects in a flattened contextual display (840) in the desktop or mobile environment. In other instances, a past web history may be uploaded from a directory and the information may be displayed in the form of information objects in a dimensional aerial or a flattened contextual display.

A virtual monocle may be rendered on any sized screen of any electronic device (e.g., mobile device, tablet, computer monitor, laptop monitor, desktop monitor, television). In some instances, it may be rendered on multiple screens and/or on multiple devices (810). A user may use gestures, touch, forces of touch, rate of touch, mouse movements or clicks, joysticks, arrows, or other means of motion to move, arrange, or manipulate networks, sub-networks, information objects or other components.

Virtual Monocle for Fictionalized Historical Events

Figure 9:
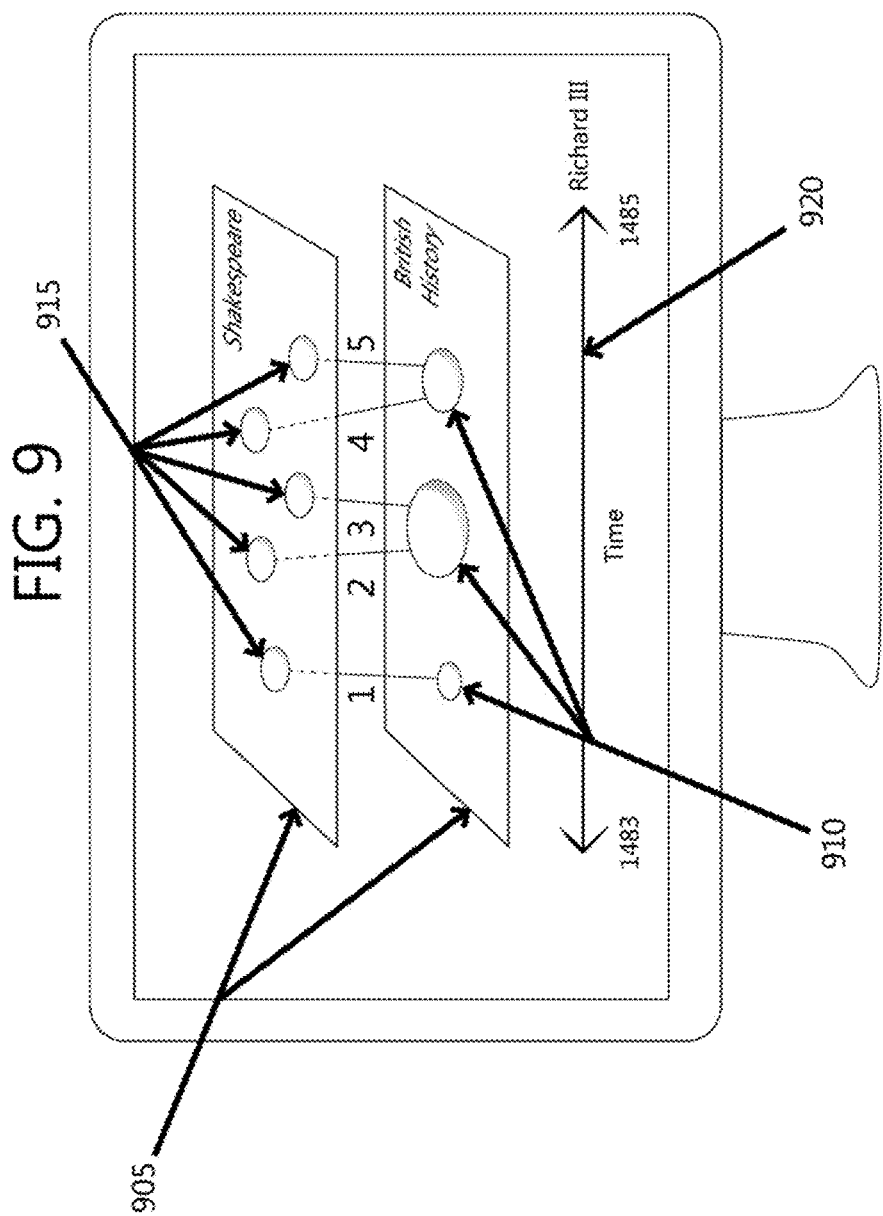
FIG. 9 illustrates the use of a dimensional aerial display depicting historical fiction in planar mode.

A virtual monocle may be configured for representing historical events and fictionalized historical events. FIG. 9 illustrates the use of planes (905) to present the relationships between key events. For example, the key events may be fictional events such as events in Shakespeare's plays like Richard III and/or historical, non-fictional events. Referring to FIG. 8, historical events (910) can be presented as information objects on one plane (i.e., bottom plane) that operates parallel to a plane comprising information events that Shakespeare created (915) (i.e., top plane). Edges are illustrated as lines connecting information objects between the two parallel planes. The edges are numbered e.g., 1, 2, 3, 4, and 5, and these numbers may be used to reference information provided in another display such as a flattened contextual display. A time axis (920) can also be presented, indicating the temporal significance of the orientation and sequence of the information objects (910, 915) with respect to each other within their planes. The information objects may be arranged such that they appear closer to the viewer or further from the viewer. A user may attach significance to the additional depth information (i.e., additional dimension). Edges may or may not affect the arrangement of information objects, depending on whether the information objects have or do not have fixed positions in their planes, and also depending on whether edges connecting objects may obscure the view of some objects unless some objects are relocated.

Computer Control Systems

Figure 10:
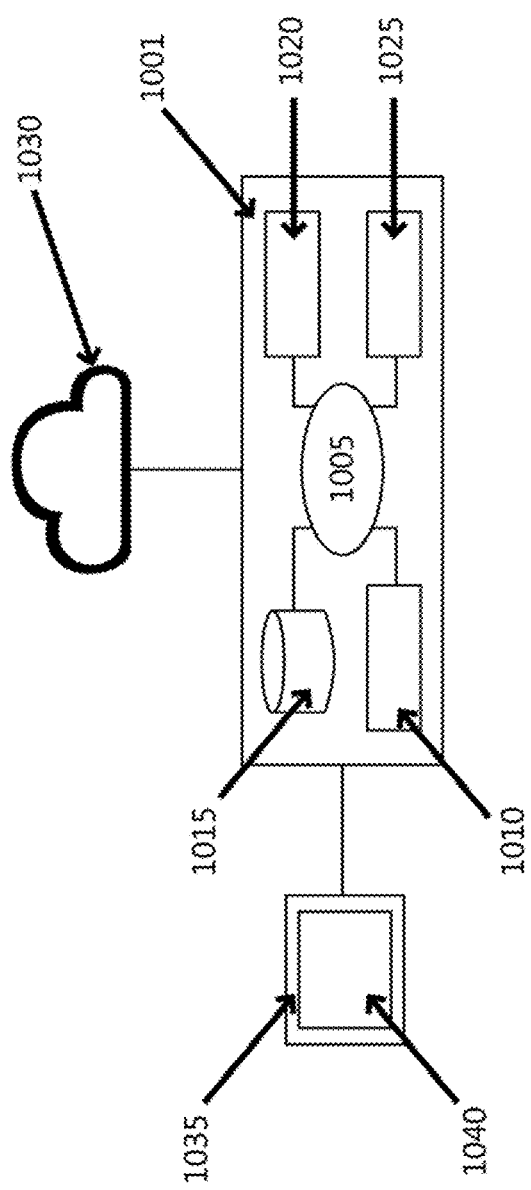
FIG. 10 shows a computer control system that is programmed or otherwise configured to implement methods provided herein.

The present disclosure provides computer control systems that are programmed to implement methods of the disclosure. FIG. 10 shows a computer system (1001) applicable to one or more devices described herein, wherein the device can be programmed or otherwise configured to collect content from various sources, e.g., databases, cloud, servers etc., and present the content as information objects. The computer system (1001) can regulate various aspects of the processing, rendering, and presentation of the content such that the user may interact with, organize, and/or access the content. In some embodiments, the system may comprise software and hardware components that compile and render the content through a graphical user interface or as described herein. The computer system (1001) can be an electronic device of a user or a computer system that is remotely located with respect to the electronic device. The electronic device can be a mobile electronic device.

The computer system (1001) includes a central processing unit (CPU, also "processor" and "computer processor" herein) (1005), which can be a single core or multi core processor, or a plurality of processors for parallel processing. The computer system (1001) also includes memory or memory location (1010) (e.g., random-access memory, read-only memory, flash memory), electronic storage unit (1015) (e.g., hard disk), communication interface (1020) (e.g., network adapter) for communicating with one or more other systems, and peripheral devices (1025), such as cache, other memory, data storage and/or electronic display adapters. The memory (1010), storage unit (1015), interface (1020) and peripheral devices (1025) are in communication with the CPU (1005) through a communication bus (solid lines), such as a motherboard. The storage unit (1015) can be a data storage unit (or data repository) for storing data. The computer system (1001) can be operatively coupled to a computer network ("network") (1030) with the aid of the communication interface (1020). The network (1030) can be the Internet, an internet and/or extranet, or an intranet and/or extranet that is in communication with the Internet. The network (1030) in some cases is a telecommunication and/or data network. The network (1030) can include one or more computer servers, which can enable distributed computing, such as cloud computing. The network (1030), in some cases with the aid of the computer system (1001), can implement a peer-to-peer network, which may enable devices coupled to the computer system (1001) to behave as a client or a server.

The CPU (1005) can execute a sequence of machine-readable instructions, which can be embodied in a program or software. The instructions may be stored in a memory location, such as the memory (1010). The instructions can be directed to the CPU (1005), which can subsequently program or otherwise configure the CPU (1005) to implement methods of the present disclosure. Examples of operations performed by the CPU (1005) can include fetch, decode, execute, and writeback.

The CPU (1005) can be part of a circuit, such as an integrated circuit. One or more other components of the system (1001) can be included in the circuit. In some cases, the circuit is an application specific integrated circuit (ASIC).

The storage unit (1015) can store files, such as drivers, libraries and saved programs. The storage unit (1015) can store user data, e.g., user preferences and user programs. The computer system (1001) in some cases can include one or more additional data storage units that are external to the computer system (1001), such as located on a remote server that is in communication with the computer system (1001) through an intranet or the Internet.

The computer system (1001) can communicate with one or more remote computer systems through the network (1030). For instance, the computer system (1001) can communicate with a remote or mounted computer system of a user (e.g., a VR enabled device, or Head Mounted Display (HMD)). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), Smart watches (e.g., Apple® Watch, Samsung® Galaxy Gear), or personal digital assistants. The user can access the computer system (1001) via the network (1030).

Methods as described herein can be implemented by way of machine (e.g., computer processor) executable code stored on an electronic storage location of the computer system (1001), such as, for example, on the memory (1010) or electronic storage unit (1015). The machine executable or machine-readable code can be provided in the form of software. During use, the code can be executed by the processor (1005). In some cases, the code can be retrieved from the storage unit (1015) and stored on the memory (1010) for ready access by the processor (1005). In some situations, the electronic storage unit (1015) can be precluded, and machine-executable instructions are stored on memory (1010).

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system (1001), can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or "machine-readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system (1001) can include or be in communication with an electronic display (1035) that comprises a user interface (UI) (1040) for providing, for example, a dimensional aerial and/or a flattened contextual display as described herein. The user interface may also be configured to visualize information in a cityscape format. The UI elements may include one or more information objects, edges, lines, arrows, buildings, structures, geometric shapes, and any other elements that are described herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit (1005). The algorithm can, for example, calculate or estimate relationships between information objects and render the objects into spatial relationships wherein the distances or other features of the information objects or information object organization are related to the relationships between information objects or content represented by the information object. The algorithm may also be implemented to update one or more visualized information based on user input or feedback.

Figure 11:
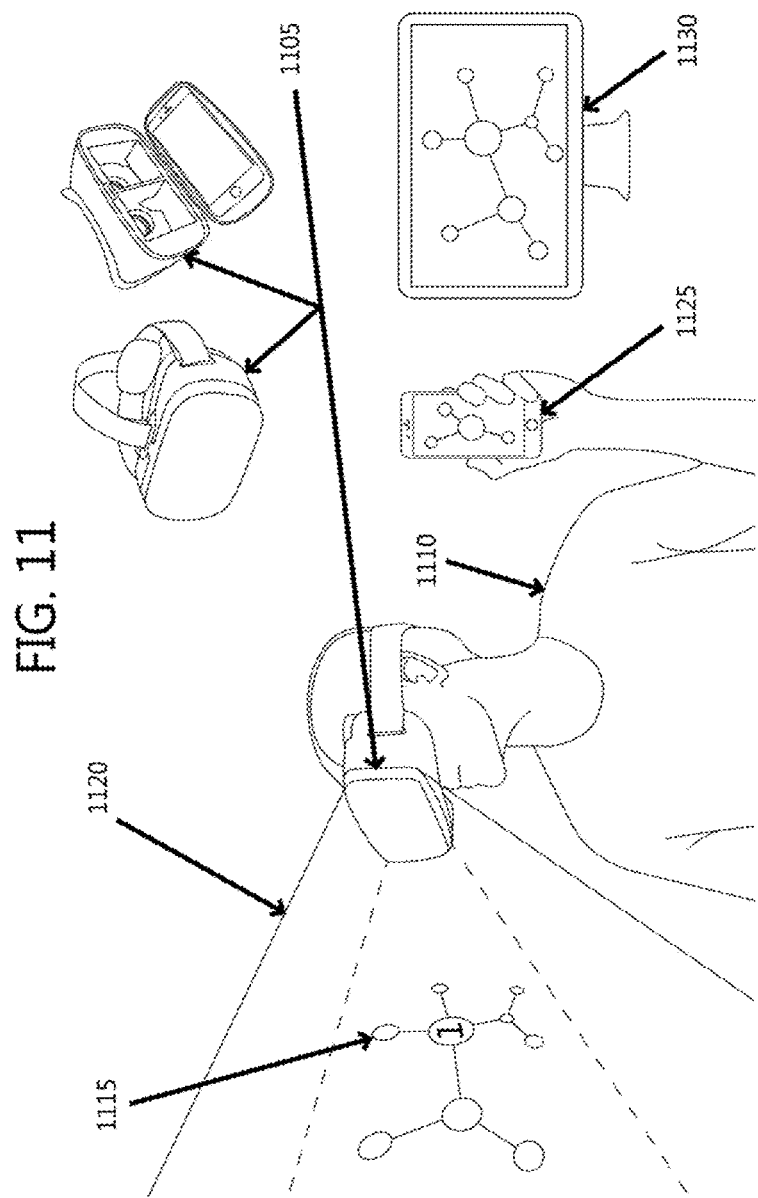
FIG. 11 shows a computer control system with a head mounted display, or virtual reality headset.

FIG. 11 illustrates a virtual monocle interface system comprising a head mounted display (1105). A head mounted display may comprise a mobile device configured as a unit for displaying content to the user (1110). A head mounted display may operate as a virtual reality (VR) headset or augmented reality (AR) headset that renders content as three-dimensional objects (1115) in a VR/AR environment (1120). The user (1110) may navigate the VR environment, and three-dimensional images or information objects may be part of the VR environment and appear to be life-sized from the perspective of the user. The VR-enabled system may be able to track a user's motions—head or eye movements—and correspondingly adjust the images of the user's display to reflect the change in perspective. The user may engage with the three-dimensional objects (1115) or images, wherein the three-dimensional objects (1115) are part of the VR environment viewable by the user via the HMD (1105). User engagement in this VR environment may comprise orienting, stretching, navigating, manipulating, or selecting objects. User may select information objects and view displayed content or relationships. In some instances, the user may orient or change the arrangement of content by selecting a shared feature of the data and having the information objects rearrange or reorient as a result of the relative relationship between the information objects and the feature. User engagement in the VR environment may be registered and impact or affect the display of information objects or contents on other devices, including user operated mobile devices (e.g. iPad, iPhones, electronic tablets) (1125) and computer monitors, televisions or other large screen displays (1130). For example, the virtual monocle interface system may comprise a VR HMD and a mobile device, wherein the VR HMD may operate as the main screen and the mobile device may operate as a secondary screen. The mobile device may be configured to capture one or more aspects of the VR environment based on the user's interaction with the environment. For example, if the user is interested in a certain information object within the VR environment (e.g., interested in the object 1015), then the user may indicate such interest with one or more gestures, and the information object may be presented on the mobile device (1125) for later viewing or record keeping purposes.

In some instances, a user may use a VR enabled device to render the virtual monocle display. A VR enabled device may comprise an altered reality or VR enabled system. A VR enabled system or VR enabled devices (1105) may comprise any device or system comprising one or more features for head tracking, motion tracking, or eye tracking. A VR enabled system may comprise a head mounted display (HMD) with a device comprising a VR enabled virtual monocle. The virtual monocle may be configured to process information from external hardware or devices, or sensor containing objects, including sensors or sensory input from VR enabled paraphernalia including head gear, goggles, gloves, suits, and other sensor containing units. A virtual monocle may also be configured for use with sensory enhancing devices or components, including headphones.

Figure 12:
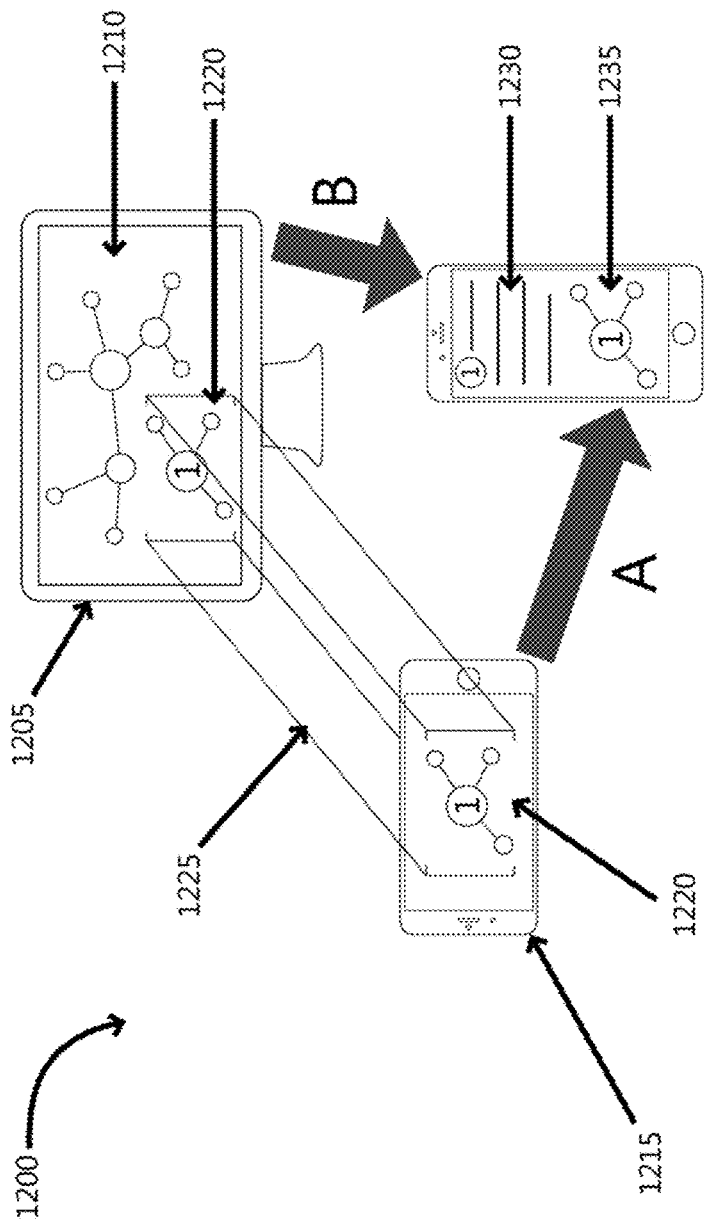
FIG. 12 shows a computer control system with a two-screen application configured with different 3D hierarchical displays of information.

A virtual monocle system may comprise two or more screens and/or devices using a 3D hierarchical display of information using two screens (1200 and 1300). FIG. 12 illustrates a virtual monocle system comprising two user interfaces. In some embodiments, a first user interface comprises a larger screen (e.g., a monitor (1205)), which is part of a first device, and a second user interface comprises a smaller screen (e.g., a mobile device screen (1215)), which is part of second device. The first user interface can display a network of information objects in a dimensional aerial display (1210), and the second user interface (1215) may be oriented relative to the first user interface at a distance such that only a portion (1220) of the information objects displayed on the first user interface is in focus (1225). The information objects in focus may be presented or organized on the second user interface in a way that is distinct from how it is presented or organized in the first user interface. Gestures may be used to select, on the smaller screen (1215), a sub-network (1220) of the dimensional aerial display presented on the larger screen (1205). Gestures may include, but not limited to, tapping, sliding, swiping, turning, waving, or other means for engaging with the user interface or the device.

In some embodiments, the camera of a mobile device may be used to select a sub-network or one or more information objects. The position, distance, or orientation of the second device or the second user interface may be used to select a sub-network or one or more information objects from the first user interface. Selection of a sub-network (1220) on the mobile device (A) or on a larger screen or monitor (B) e.g. from a laptop television or other device, may result in display of the contextual information for the selected sub-network or information object as a flattened contextual display on the mobile device or other screen. The flattened contextual display may show details including written words or information (1230) as well as a diagram of the local contextual information (1235) for the selected sub-network or information object. In other embodiments, the flattened contextual display may be shown on a larger screen or monitor and the dimensional aerial display may be presented on a smaller screen (e.g. the smaller screen of a mobile device). In further embodiments, a user may be able to swap screens; for example, the user may first display the flattened contextual display on a larger screen or monitor and the dimensional aerial display on a smaller screen (e.g. a mobile device screen), then using one or more gestures, buttons, commands, or other means the user may be able to switch the display such that the dimensional aerial display is on a larger screen and the flattened contextual display is on a smaller screen.

Figure 13:
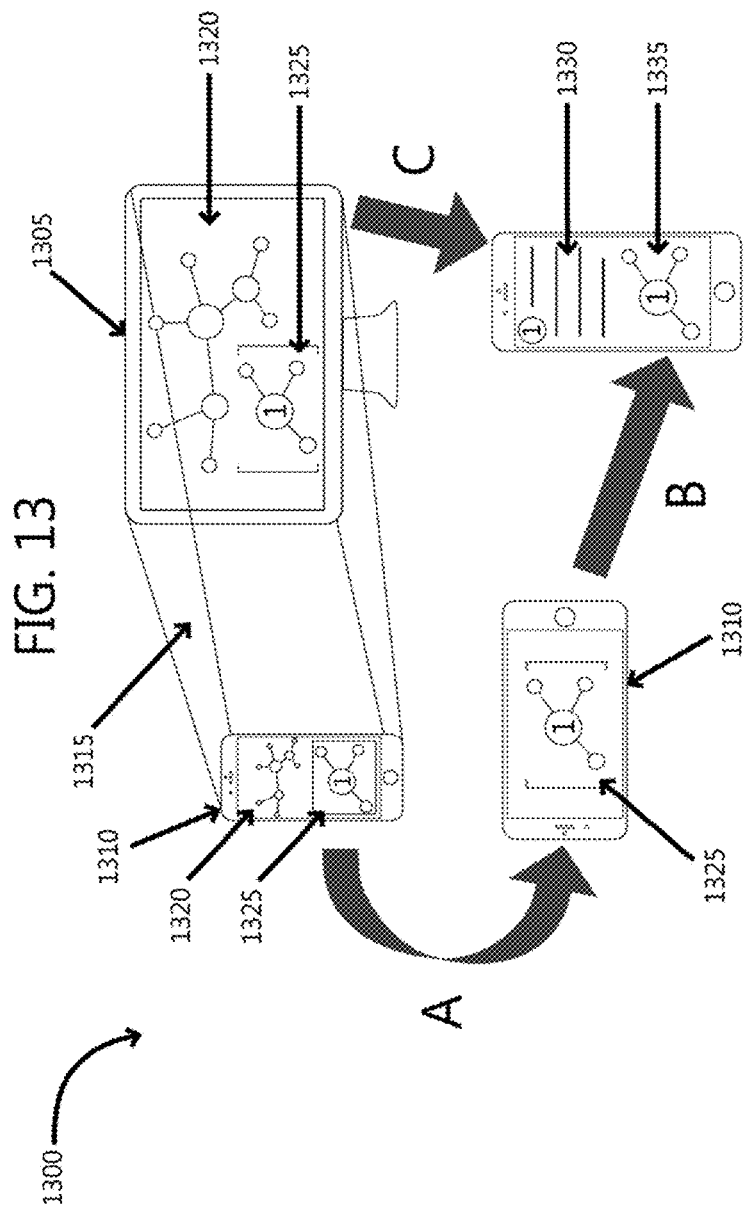
FIG. 13 shows a computer control system with a two-screen application configured with similar 3D hierarchical display of information using two screens.

FIG. 13 illustrates another embodiment of the virtual monocle system (1300), wherein the dimensional aerial display (1320) is presented on both (1315) the larger screen (1305) (e.g. of a laptop screen, desktop monitor, television), and the smaller screen (1310) of a mobile device. In this example, the zoom is not used on any of the devices. Instead, a user may select (e.g. mouse click, touch, gestures including flicking or other means of selecting) a sub-network (1325) or information object on one of the screens or devices (e.g., the larger screen (C) or the smaller screen (B)) and information for the selected sub-network or information object may be displayed in a flattened contextual display. For example, the user may select, based on one or more gestures (e.g., rotating the mobile devices (1310)), to view the flattened contextual display of the information object (1330), instead of the multi-dimensional view (1325). The flattened contextual display may have written details (1330) regarding the sub-network or information object (1335) as well as a depiction of the local connectivity of the information objects.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for visualizing a structured, multi-dimensional dataset on multiple display units, comprising:
    (a) receiving, from a database, datasets according to a user request, the datasets comprising a plurality of information objects, wherein the plurality of information objects are a set of records linked or related using a mathematical relationship defined in a multi-dimensional space and wherein each information object comprises structured data including sub-objects;
    (b) displaying, on a first graphical user interface of a first device, a first visualization of the plurality of information objects;
    (c) determining, by one or more processors, which subset of the plurality of information objects to be displayed on a second graphical user interface based at least on user information, user inputs, and information obtained from the first device and a second device, wherein the information comprises one or more members selected from the group consisting of a position, distance, and orientation of the second device with respect to the first device once the first device is connected to the second device; and
    (d) displaying, on the second graphical user interface of the second device, a second visualization of the subset of the information objects, the second visualization different in form from the first visualization.

2. The method of claim 1, wherein the first visualization is in a three-dimensional space.

3. The method of claim 2, wherein the second visualization is in a two-dimensional space.

4. The method of claim 1, wherein the first visualization or the second visualization is in a virtual reality environment.

5. The method of claim 2, wherein the plurality of information objects are represented in the three-dimensional space using aerial projections.

6. The method of claim 5, wherein the subset of the plurality of information objects are represented in a two-dimensional space, wherein the subset of the plurality of information objects are flattened into a two-dimensional space and additional contextual information related to the information objects are introduced on the second graphical user interface.

7. The method of claim 5, wherein the information objects have different geometric shapes based at least on the type of the information, the importance of the information, and user feedback or input.

8. The method of claim 7, wherein the geometric shapes comprise barrels, cones, cubes, cylinders, ellipsoids, polygons, and pyramids.

9. The method of claim 5, wherein the more important information objects have larger sized geometric shapes compared to less important information objects.

10. The method of claim 5, wherein the correlation among information objects is visualized using edges, wherein the edges comprise lines or arrows.

11. The method of claim 5, wherein the information objects are repositioned and highlighted for visualization of contextual information.

12. The method of claim 2, wherein the plurality of information objects are represented in a cityscape visual format, wherein each information object is represented by a building structure and the structured data within each information object is represented as floors of the building structure.

13. The method of claim 12, wherein the first visualization includes building structures and the second visualization includes floors.

14. The method of claim 1, wherein the first graphical user interface is larger than the second graphical user interface.

15. The method of claim 1, wherein the second device is a mobile device.

16. The method of claim 4, wherein the first device is a head-mounted display configured to project the plurality of objects in the virtual environment and wherein the subset of the plurality of information objects are determined based at least on the orientation and eye-movement of a user of the head-mounted display.

17. The method of claim 1, wherein the second device is a head-mounted display configured to project the subset of the plurality of objects in a virtual environment.

18. The method of claim 1, wherein the information obtained by the first device and the second device comprises orientation and motion data, wherein the orientation and motion data is obtained from sensors onboard the first device and second device.

19. The method of claim 1, wherein the dataset further comprises a context array, the context array comprising data on the user including the user's identity, historic activity, and preferences, and wherein the first visualization and the second visualization are based at least on the context array.

20. The method of claim 1, wherein the user inputs comprise gestures.

21. The method of claim 20, wherein the gestures comprise tap, double-tap, drag, pinch, press, swipe.

22. A virtual monocle interface system for visualizing information, comprising:
    a database configured to store a plurality of information objects, wherein the plurality of information objects are a set of records linked or related using a mathematical relationship defined in a multi-dimensional space and wherein each information object comprises structured data including sub-objects;
    a first device comprising a first graphics user interface;
    a second device comprising a second graphical user interface; and
    one or more processors in communication with a computer readable medium storing software instructions that are executable by the one or more processors in order to cause the virtual monocle interface system to:
        receive, from the database, the plurality of information objects corresponding to a user request;
        display, on the first graphical user interface of the first device, a first visualization of the plurality of information objects;
        determine, by the one or more processors, which subset of the plurality of information objects to be displayed on the second graphical user interface based at least on user information, user inputs, and information obtained from the first device and the second device, wherein the information comprises one or more members selected from the group consisting of a position, distance, and orientation of the second device with respect to the first device once the first device is connected to the second device; and
        display, on the second graphical user interface of the second device, a second visualization of the subset of the information objects, the second visualization different in form from the first visualization.

23. The system of claim 22, wherein the first visualization is in a three-dimensional space.

24. The system of claim 23, wherein the second visualization is in a two-dimensional space.

25. The system of claim 22, wherein the first visualization or the second visualization are in a virtual reality environment.

26. The system of claim 23, wherein the plurality of information objects are represented in the three-dimensional space using aerial projections.

* * * * *